US012795036B2

(12) United States Patent
Nguyenvan

(10) Patent No.: US 12,795,036 B2
(45) Date of Patent: Nov. 10, 2026

(54) READING DEVICE INCLUDING TOUCHSCREEN TO DISPLAY SCAN-IN-PROGRESS SCREEN WITH CANCEL BUTTON TO CANCEL PULL SCAN

(71) Applicant: BROTHER KOGYO KABUSHIKI KAISHA, Nagoya (JP)

(72) Inventor: Thanh Nguyenvan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 69 days.

(21) Appl. No.: 18/959,892

(22) Filed: Nov. 26, 2024

(65) Prior Publication Data

US 2025/0211700 A1 Jun. 26, 2025

(30) Foreign Application Priority Data

Dec. 26, 2023 (JP) ................................. 2023-219601

(51) Int. Cl.
*H04N 1/44* (2006.01)
*H04N 1/00* (2006.01)

(52) U.S. Cl.
CPC ....... *H04N 1/4433* (2013.01); *H04N 1/00384* (2013.01); *H04N 1/00411* (2013.01); *H04N 1/00477* (2013.01); *H04N 1/4413* (2013.01); *H04N 2201/0094* (2013.01)

(58) Field of Classification Search
CPC ............. H04N 1/4433; H04N 1/00384; H04N 1/00411; H04N 1/00477; H04N 1/4413; H04N 2201/0094
USPC ........................................................ 358/1.14
See application file for complete search history.

(56) References Cited

U.S. PATENT DOCUMENTS

2011/0122435 A1* 5/2011 Nishiyama ......... H04N 1/00222 358/1.15
2014/0002840 A1 1/2014 Takano
2015/0249755 A1* 9/2015 Hayakawa ......... H04N 1/32566 358/1.15

FOREIGN PATENT DOCUMENTS

JP 2014-30182 A 2/2014

* cited by examiner

*Primary Examiner* — Charlotte M Baker
(74) *Attorney, Agent, or Firm* — Scully, Scott, Murphy & Presser, P. C.

(57) ABSTRACT

A controller of a reading device starts a pull scan based on a received execution instruction. The controller displays a first scan-in-progress screen on the touchscreen under a first display condition. The first scan-in-progress screen includes no cancel button to cancel the started pull scan. The first display condition includes a requirement that first user authentication information is received in association with the execution instruction and a requirement that the pull scan is started. The controller displays a second scan-in-progress screen on the touchscreen under a second display condition. The second scan-in-progress screen includes a cancel button to cancel the started pull scan. The second display condition includes a requirement that the first user authentication information is not received in association with the execution instruction and a requirement that the pull scan is started. The controller cancels the started pull scan when the cancel button is operated.

14 Claims, 15 Drawing Sheets

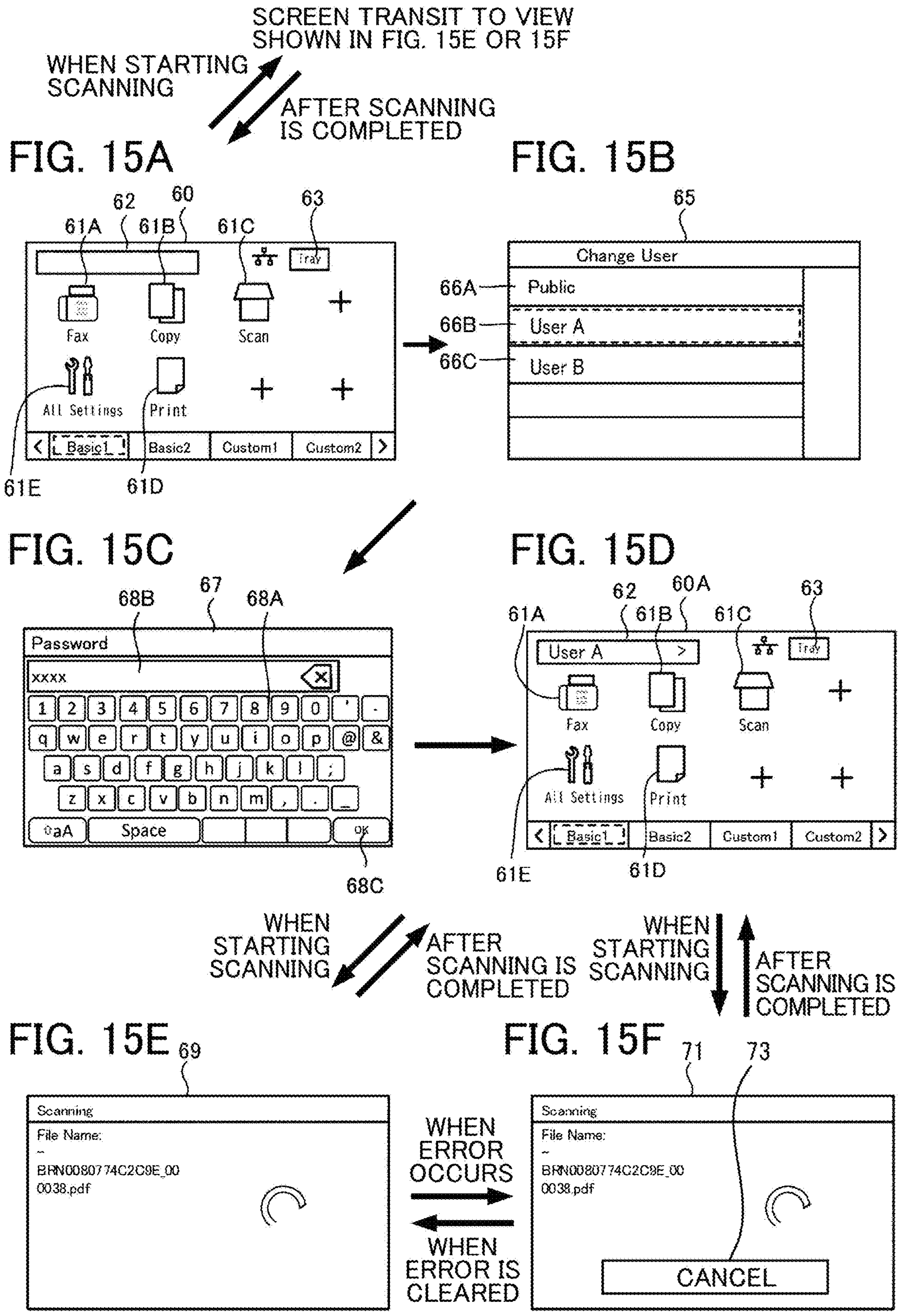
SCREEN TRANSIT TO VIEW SHOWN IN FIG. 15E OR 15F
WHEN STARTING SCANNING
AFTER SCANNING IS COMPLETED
FIG. 15A
62
60
63
61A
61B
61C
Tray
Fax
Copy
Scan
All Settings
Print
Basic1
Basic2
Custom1
Custom2
61E
61D
FIG. 15B
65
Change User
66A
Public
66B
User A
66C
User B
FIG. 15C
68B
67
68A
Password
xxxx
1 2 3 4 5 6 7 8 9 0 ' -
q w e r t y u i o p @ &
a s d f g h j k l ;
z x c v b n m , . _
aA
Space
ok
68C
FIG. 15D
62
60A
63
61A
61B
61C
User A
Tray
Fax
Copy
Scan
All Settings
Print
Basic1
Basic2
Custom1
Custom2
61E
61D
WHEN STARTING SCANNING
AFTER SCANNING IS COMPLETED
WHEN STARTING SCANNING
AFTER SCANNING IS COMPLETED
FIG. 15E
69
Scanning
File Name:
BRN00807 74C2C9E_00
0038.pdf
WHEN ERROR OCCURS
WHEN ERROR IS CLEARED
FIG. 15F
71
73
Scanning
File Name:
BRN00807 74C2C9E_00
0038.pdf
CANCEL

READING DEVICE INCLUDING TOUCHSCREEN TO DISPLAY SCAN-IN-PROGRESS SCREEN WITH CANCEL BUTTON TO CANCEL PULL SCAN

REFERENCE TO RELATED APPLICATIONS

This application claims priority from Japanese Patent Application No. 2023-219601 filed on Dec. 26, 2023. The entire content of the priority application is incorporated herein by reference.

BACKGROUND ART

A conventionally known reading device can perform a pull scan by controlling a scanner to read a document in response to an execution instruction received from an external device. A list of users permitted to execute pull scans is registered on the reading device in advance. When the reading device receives an instruction to execute a pull scan, the device performs an authentication process to determine whether the user that issued the execution instruction matches a registered user. When authentication is successful, the reading device begins the pull scan operation.

SUMMARY

Occasionally, the user of such a reading device may wish to cancel a scan after issuing an execution instruction. It is conceivable that the reading device should determine which users are permitted to issue a cancellation instruction to handle such a situation. However, the description of the conventional device does not cover this process and, hence, the above technology has room for improvement in this regard.

In view of the foregoing, it is an object of the present disclosure to provide a reading device capable of permitting only appropriate users to cancel a scanning operation.

In order to attain the above and other objects, the present disclosure provides a reading device. The reading device includes a scanner, a touchscreen, and a controller. The controller is configured to perform: receiving an execution instruction issued from an external device, the execution instruction instructing the controller to perform a pull scan, the pull scan including: controlling the scanner to read an original to generate scan data based on the original; and returning the scan data to the external device; starting the pull scan based on the received execution instruction under a first pull scan start condition, the first pull scan start condition including a requirement that the execution instruction is received; displaying a first scan-in-progress screen on the touchscreen under a first display condition, the first scan-in-progress screen including no cancel button to cancel the started pull scan, the first display condition including: a requirement that first user authentication information is received in association with the execution instruction; and a requirement that the pull scan is started; displaying a second scan-in-progress screen on the touchscreen under a second display condition, the second scan-in-progress screen including a cancel button to cancel the started pull scan, the second display condition including: a requirement that the first user authentication information is not received in association with the execution instruction; and a requirement that the pull scan is started; and cancelling the started pull scan under a first cancellation condition, the first cancellation condition including a requirement that the cancel button is operated.

In order to attain the above and other object, the present disclosure provides a reading device. The reading device includes a scanner, a hardware key to receive an input operation, and a controller. The controller is configured to perform: receiving an execution instruction issued from an external device, the execution instruction instructing the controller to perform a pull scan, the pull scan including: controlling the scanner to read an original to generate scan data based on the original; and returning the scan data to the external device; starting the pull scan based on the received execution instruction under a first pull scan condition, the first pull scan condition including a requirement that the execution instruction is received; and cancelling the started pull scan under a first cancellation condition, the first cancellation condition including a requirement that no user authentication information is received in association with the execution instruction; and a requirement that a cancellation operation is received through the hardware key while the pull scan is in progress. Despite receiving the cancellation operation through the hardware key while the pull scan is in progress, the controller continues the pull scan under a continuation condition, the continuation condition including a requirement that first user authentication information is received in association with the execution instruction.

In the above structures, an appropriate user can cancel the started scan.

BRIEF DESCRIPTION OF DRAWINGS

FIG. 15A is an explanatory diagram illustrating a standby screen displayed on a user interface of MFP.

FIG. 15B is an explanatory diagram illustrating a user selection screen displayed on the user interface.

FIG. 15C is an explanatory diagram illustrating a password entry screen displayed on the user interface.

FIG. 15D is an explanatory diagram illustrating a post-login standby screen displayed on the user interface.

FIG. 15E is an explanatory diagram illustrating a scan-in-progress screen displayed on the user interface.

FIG. 15F is an explanatory diagram illustrating a scan-in-progress screen displayed on the user interface.

DESCRIPTION

Figure 1:
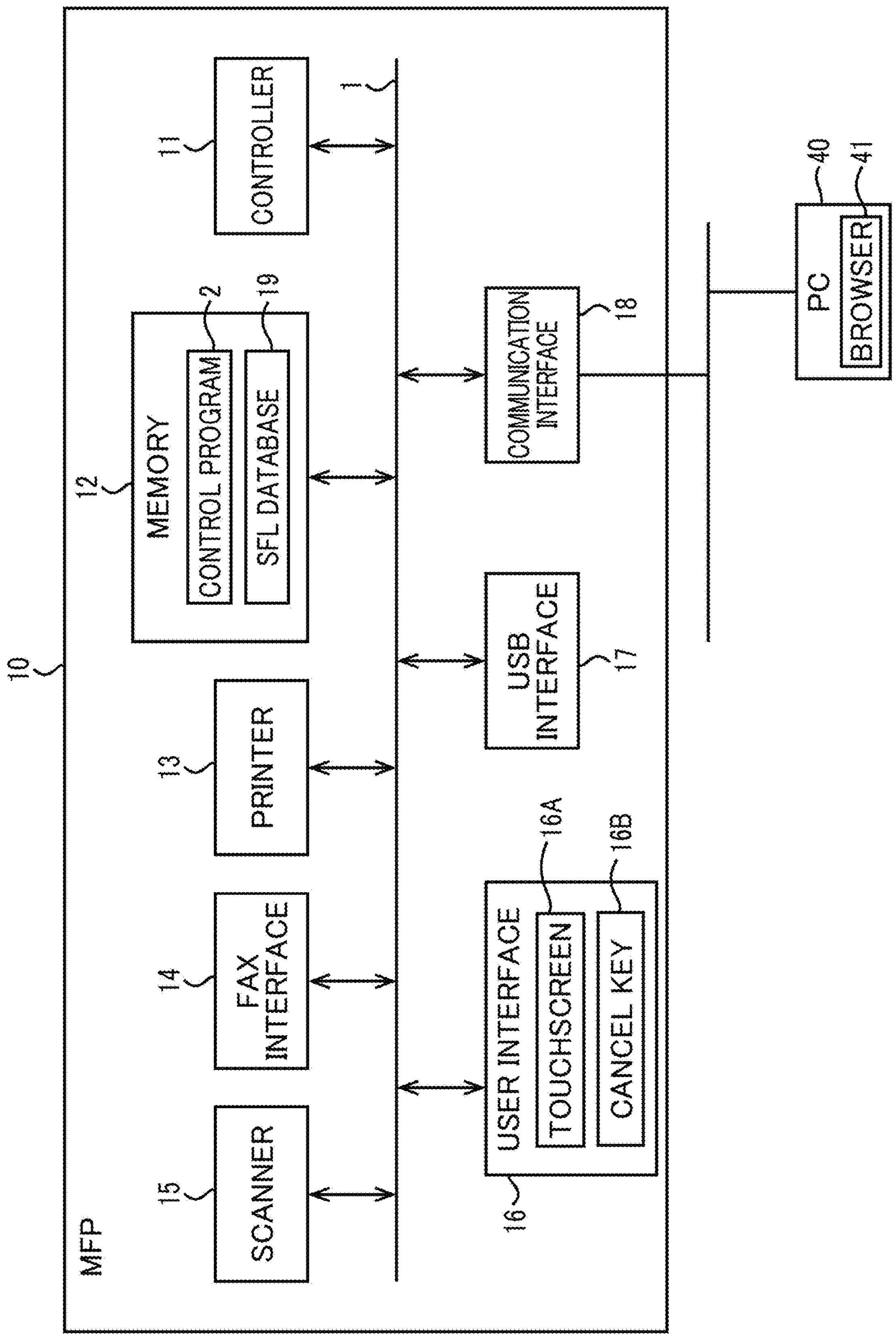
FIG. 1 is a block diagram illustrating a configuration of a multifunction peripheral (MFP).

Next, a multifunction peripheral (MFP) 10 will be described as an embodiment of the reading device. As shown in FIG. 1, the MFP 10 is provided with a controller 11, a memory 12, a printer 13, a fax interface 14, a scanner 15, a user interface 16, a USB interface 17, and a communication interface 18. These components are interconnected via a bus 1 and can communicate with one another.

The printer 13 prints images on recording media such as sheets or discs. Examples of sheets include paper and transparencies. The printer 13 may print using an inkjet method, an electrophotographic method, or the like. The scanner 15 has an image sensor, such as a charge-coupled device (CCD) or a contract image sensor (CIS), that generates image data by reading an original document.

The user interface 16 can accept various operations for the MFP 10. The user interface 16 includes a touchscreen 16A with a liquid crystal display, and various operating keys including a Cancel key 16B described later. The Cancel key 16B is a hardware key. A USB-compliant storage medium or the like can be detachably connected to the USB interface 17, whereby the USB interface 17 can read data from and write data to the storage medium through communications conforming to the USB standard. A USB-compliant storage medium is a USB memory device, for example. The MFP 10 connects to a network via the communication interface 18 and communicates with a PC 40 over the network according to a predetermined protocol (e.g., TCP/IP). The communication interface 18 may be configured of a wired or wireless LAN interface or the like.

The controller 11 is a processing device (a processor) provided with a CPU and the like, for example. The memory 12 is configured of a combination of volatile memory such as RAM, nonvolatile memory such as NVRAM, ROM, and the like. A solid-state drive (SSD), a hard disk drive (HDD), and the like may also be used as nonvolatile memory. The controller 11 is also provided with a buffer that may be considered a part of the memory 12. The controller 11 uses the buffer when executing the various programs. The memory 12 may also be a storage medium that can be read by the controller 11. A storage medium that is readable by the controller 11 is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory storage medium.

The memory 12 stores a control program 2 that is executable by the controller 11. The control program 2 is firmware that implements overall control of the components in the MFP 10, for example. By executing the control program 2, the controller 11 controls each device connected to the bus 1. The present embodiment primarily describes processes executed by the controller 11 according to instructions described in programs. In other words, actions such as "determine," "identify," "acquire," "accept," and "control" in the following description represent processes performed by the controller 11. Note that the term "acquire" in this specification is used as a concept that does not necessarily require a request. In other words, a process by which the controller 11 receives data without requesting that data is included in the concept of "the controller 11 acquires data." The term "data" used in this specification denotes a bit string that can be read by the controller 11. Data of different formats but having essentially the same semantic content will be treated as the same data. The same treatment will be applied to "information" in this specification.

The control program 2 also includes an embedded web server (EWS) program that functions as a web server, for example. By executing the EWS program, the controller 11 can control the MFP 10 to function as a web server. "EWS" will be used to refer to the web server implemented with the MFP 10. The controller 11, functioning as the web server for example, transmits web page data for displaying web pages to the PC 40, enabling a browser 41 of the PC 40 described later to display the prescribed web pages. The transmission of web page data will also be described as supplying web pages.

Next, the configuration of the PC 40 will be described. While not shown in the drawings, the PC 40 is provided with a communication interface, a memory, a controller (a processor), a display, and a user interface. The memory of the PC 40 stores an operating system (OS) and a browser 41. The browser 41 can display a web page on the display of the PC 40 based on web page data received from the MFP 10. The PC 40 is the example of the external device. Note that the external device communicating with the MFP 10 is not limited to the PC 40 but may be a device capable of transmitting an instruction to the MFP 10 to execute a pull scan described later, such as a smartphone, a tablet computer, or another portable terminal.

Next, a feature called "Secure Function Lock" will be described. The MFP 10 in the present embodiment has a Secure Function Lock feature (hereinafter referred to as the "SFL feature"). The SFL feature configures what functions of the MFP 10 are permitted and not permitted for each user and restricts the execution of functions for which a user is not permitted to use. Setting functions of the MFP 10 to "not permitted" will also be referred to as "restricting" those functions. The controller 11 accepts settings through the EWS, for example, for enabling/disabling the SFL feature, registering a user, registering a password, and restricting functions for individual users. Settings related to restricting functions may also be considered permission-related settings. Specifically, permission-related settings indicate whether or not a user is permitted to use certain functions. The controller 11 registers information received through the EWS in a SFL database 19 stored in the memory 12. The method of receiving settings is not limited to reception via the EWS but may be reception via the user interface 16.

Figure 2:
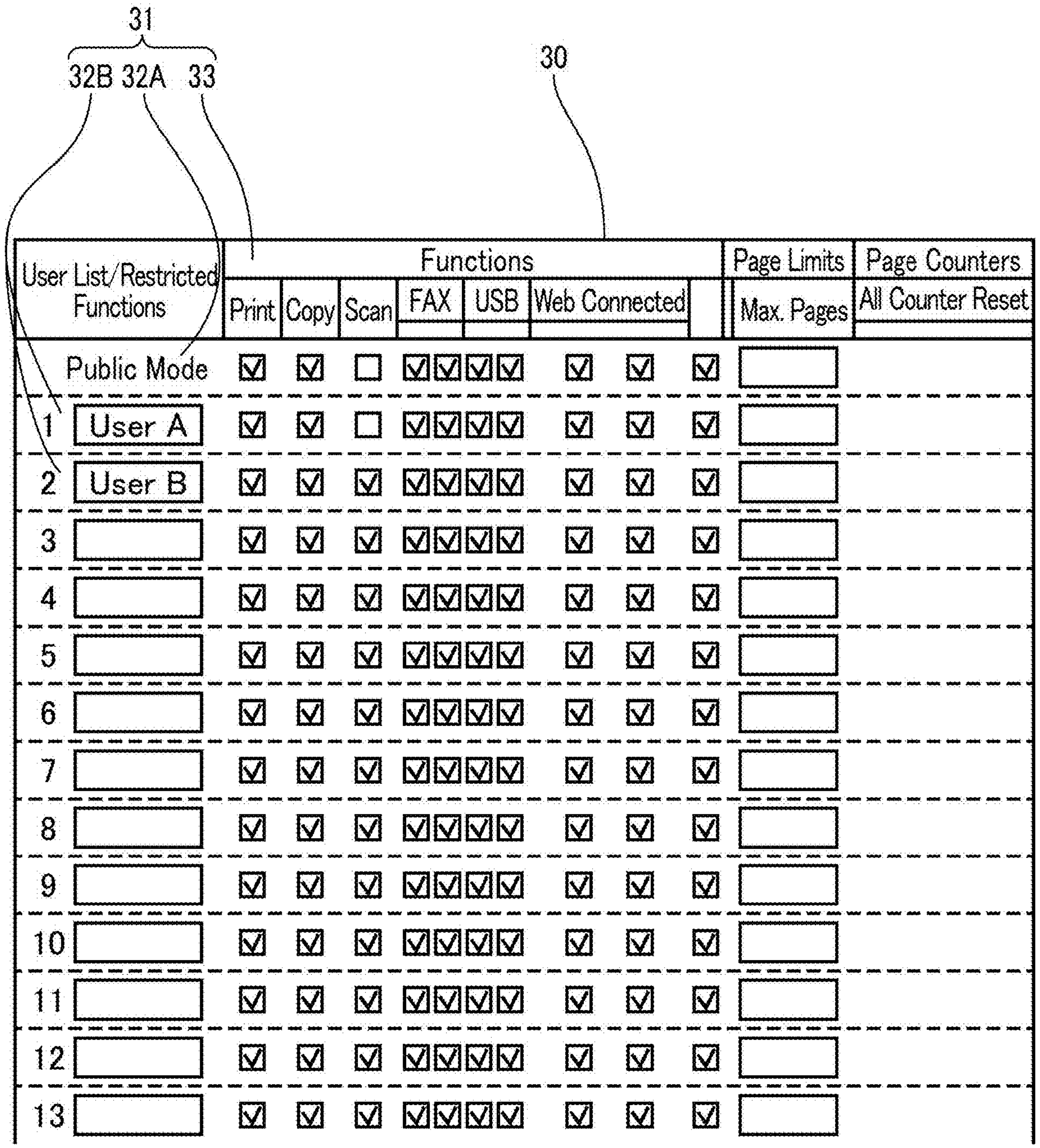
FIG. 2 is an explanatory diagram illustrating a restriction configuration screen.

FIG. 2 shows a restriction configuration screen 30 that accepts input designating functions to be restricted and permitted for individual users. For example, the controller 11 supplies a web page to the browser 41 of the PC 40 that has access to the EWS. When an administrator performs login operations in this web page, the controller 11 supplies the PC 40 with a web page for enabling or disabling the SFL feature, and a web page showing the restriction configuration screen 30 of FIG. 2.

The restriction configuration screen 30 has a restriction designation area 31 that accept designations of users and functions to be subjected to restrictions according to the SFL feature. The restriction designation area 31 has user designation fields 32 (32A, 32B) for specifying users to be subjected to restrictions, and function designation fields 33 for specifying which functions are to be permitted or not permitted. There is a plurality of the user designation fields 32. Among them, "Public Mode" 32A is a field for which the subject of the SFL feature is users when the MFP 10 is a locally logged-out state in which no user is locally logged in to the MFP 10. In other words, this area specifies what restrictions are set without identifying a local (or offline) user. Here, the term "local" refers to a situation where the subject, such as a user, directly interacts with a device, such as the MFP 10 without relying on network connectivity. Thus, a locally logged-in state is a state in which a user is directly logged in to the MFP 10 using user interface 16.

A state that a user is logged in to the MFP 10 indicates that the MFP 10 has authenticated the user and can accept further access from the user. That is, the logged-in state, such as a locally logged-in state, refers to the condition that follows after a user has been authenticated, indicating that the authenticated user is permitted to access the MFP 10. In other words, to log in to the MFP 10, the user must be authenticated. However, while the authentication is a prerequisite for entering the logged-in state, successful authentication alone does not necessarily mean the MFP 10 is in the logged-in state. The MFP 10 is considered to be in the logged-in state when access is granted to the authenticated user.

Individual user fields 32B are fields for inputting usernames specifying users to be subjected to the SFL feature. In other words, these areas specify specific users for which restrictions are set. A function designation field 33 is provided to the right of each user designation field 32. The function designation field 33 to the right of an individual user designation field 32 is an area for indicating whether individual functions are permitted or not permitted for the user specified in the user designation field 32.

The function designation field 33 is also an area for accepting designations for functions to be restricted by the SFL feature. The function designation field 33 has checkboxes for indicating whether or not a restriction has been set for each of functions of the MFP 10, including "Print," "Copy," "Scan," "Fax," "USB," and "Web Connected." The "Scan" function here corresponds to push scans described later. When the "Scan" function is restricted for a user, the user cannot execute push scans and when a user is not permitted to execute push scans, the user is also not permitted to execute pull scans. All checked functions in the function designation field 33 are non-restricted functions, i.e., functions that the user is permitted to execute, while unchecked functions are restricted functions, i.e., functions that the user is not permitted to execute. The "Fax" function includes two separate functions, "Fax transmission" and "Fax reception," with a checkbox for each. The "USB" function includes the separate functions "USB direct print" and "Scan-to-USB," with a checkbox for each. The "Web Connected" function includes the separate functions "Upload" and "Download," with a checkbox for each. The items of checkboxes to set restrictions are just examples.

In the example shown in FIG. 2, only the "Scan" function is unchecked in the function designation field 33 for the "Public Mode" 32A, while all other functions are checked. In this case, in the locally logged-out state in which no user is locally logged in to the MFP 10, the MFP 10 restricts the execution of the "Scan" function but does not restrict the execution of functions other than the "Scan" function. Similarly, User A and User B in the individual user fields 32B are either restricted or not restricted from using functions according to their checked status. For convenience, the phrase "restricted or not restricted" may be shortened to simply "restricted" in the following description, unless there is a possibility of confusion. While the SFL feature is enabled and the MFP 10 is in the locally logged-in state where any user is locally logged in to the MFP 10, the controller 11 restricts functions based on the settings for the locally logged-in user. Further, when the controller 11 receives an instruction from the PC 40 that requires authentication, the controller 11 restricts use of functions based on settings for the authenticated user. Once an OK button (not shown) in the restriction configuration screen 30 is operated, the controller 11 updates the values for settings in the SFL database 19 based on input received in the restriction configuration screen 30.

Note that the controller 11 may also store various settings in the memory 12 to be used in place of and/or in addition to the SFL database 19. For convenience, storing settings in the memory 12 may also be referred to as "configuring settings" or the like. Also, for convenience, the condition of settings being stored in the memory 12 may be referred to using expressions such as "settings are configured," "settings are set," and "settings have been configured."

Next, steps in a process executed by the controller 11 when a user uses the "Scan" function on the MFP 10 will be described. Under the "Scan" function, the MFP 10 can execute both push scans and pull scans. The controller 11 generates scan data from image data outputted by the scanner 15 when reading a document. The scan data is one type of image data. A push scan is performed in response to an execution instruction that the user issues through operations on the user interface 16. In a push scan, the controller 11 generates scan data by controlling the scanner 15 to read a document and outputs the generated scan data to an output destination provided in the execution instruction. Because the execution instruction of the push scan is issued through the user interface 16, the output destination to which scan data is to be transmitted in the push scan is designated through the user interface 16. For example, the controller 11 transmits the scan data to the destination. The PC 40 or another device connected to the MFP 10 via the USB interface 17 or communication interface 18, for example, may be specified as the output destination for data generated in a push scan. A pull scan is performed in response to an execution instruction transmitted from an external device when the user performs operations on the external device. In a pull scan, the controller 11 generates scan data by controlling the scanner 15 to read a document and transmits the generated scan data to a device (the external device in this case) from which the execution instruction was received (a transmission source of the execution instruction). The execution instruction of the pull scan may include an instruction to generate scan data and an instruction to return the generated scan data. However, the execution instruction may include, as information of a destination device to which scan data is to be transmitted, information of the device that is the same as the transmission source of this execution instruction, instead of or in addition to the instruction to return the scan data. In the present embodiment, the external device will be the PC 40.

Figure 3:
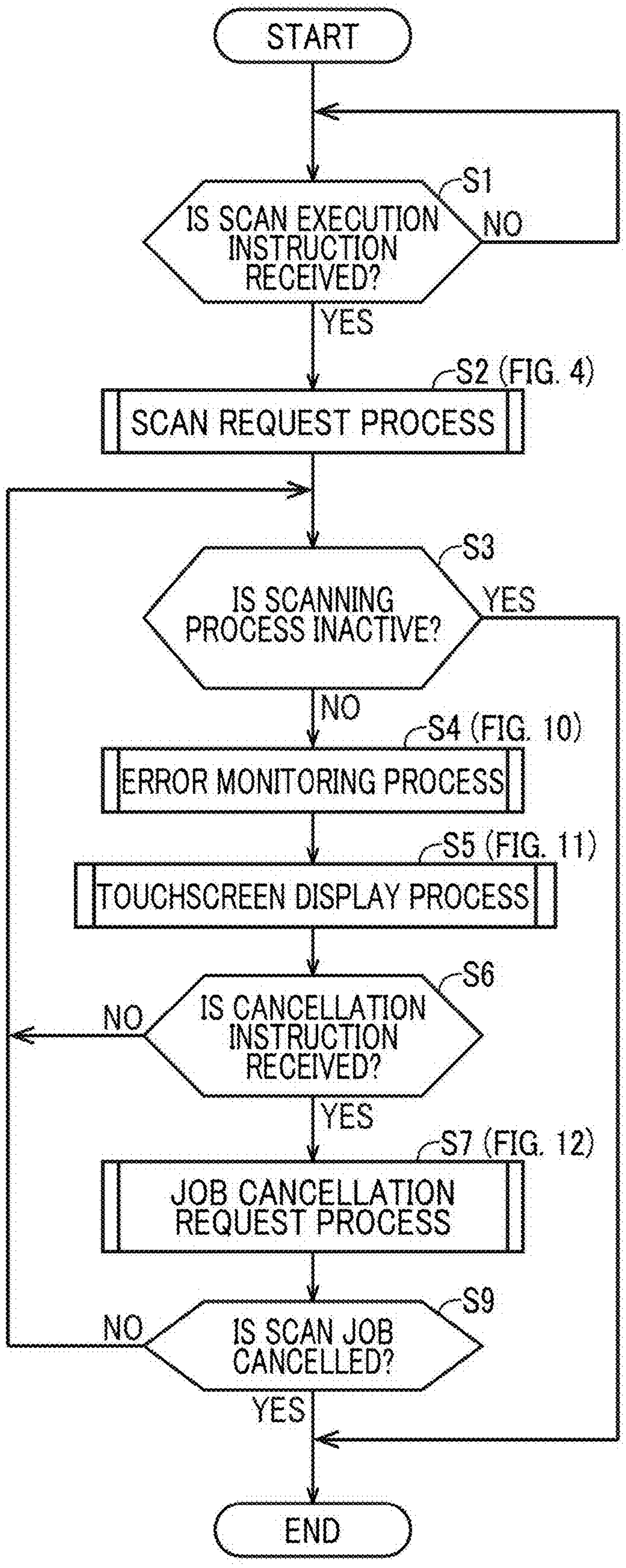
FIG. 3 is a flowchart illustrating a scan control process executed by the MFP.

FIG. 3 shows steps in a scan control process executed by the controller 11 of the MFP 10. The controller 11 begins this scan control process when the power to the MFP 10 is turned on and the controller 11 executes the control program 2 to start up the system. However, the condition for starting the process in FIG. 3 is not limited to the system being started up. For example, the controller 11 may begin the process of FIG. 3 upon returning from a power-saving mode for suppressing power consumption. The following description will first assume that the restriction settings shown in FIG. 2 have been recorded in the SFL database 19.

In the scan control process, the controller 11 determines whether to permit scanning. Once the scanning is permitted and the scanning is started, the controller 11 can receive a cancellation instruction for cancelling (or terminating) the scanning. Further, upon receipt of the cancellation instruction, the controller 11 determines whether to permit cancelling the scan by considering whether the cancellation instruction is received locally (directly) or externally (remotely).

In step 1 (S1) of FIG. 3, the controller 11 first determines whether an execution instruction for a scan was received. Hereinafter, "step" will be abbreviated as "S". The controller 11 repeatedly loops back to S1 while determining that an execution instruction for a push scan or a pull scan was not received (S1: NO) and executes a scan request process in S2 when determining that an execution instruction for a scan was received (S1: YES). The scan request process of S2 is a process to determine whether to permit the push or pull scan instructed in the execution instruction.

Figure 4:
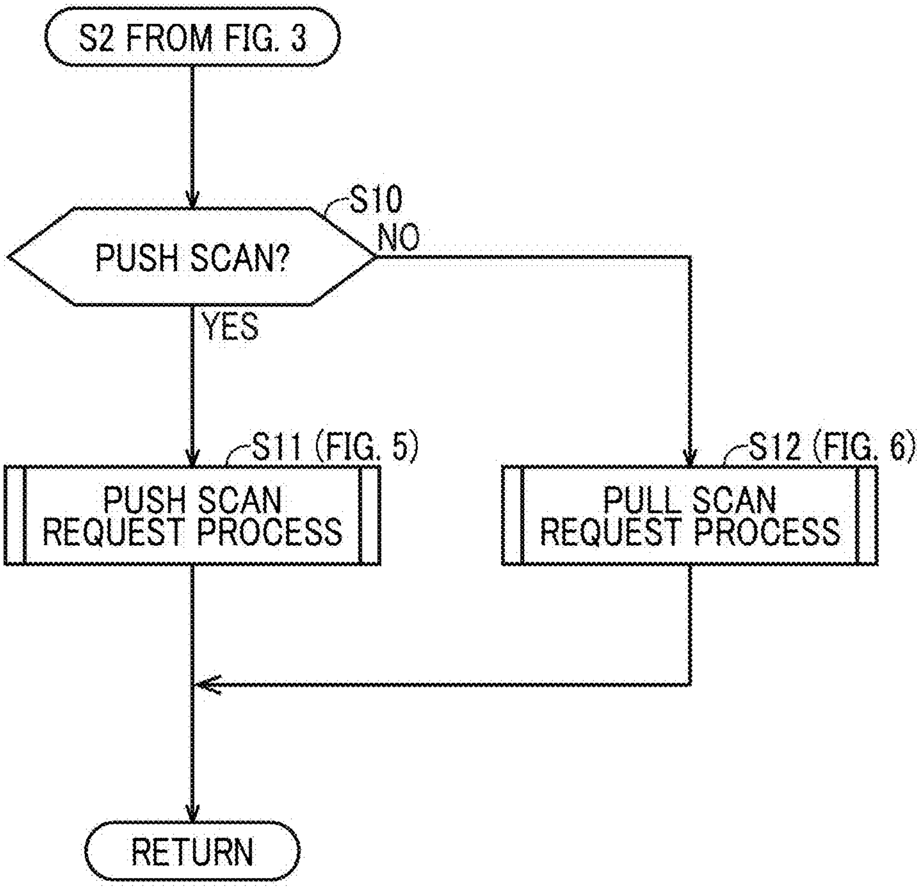
FIG. 4 is a flowchart illustrating details of a scan request process of S2 shown in FIG. 3.

FIG. 4 shows steps in the scan request process of S2. In S10 of FIG. 4, the controller 11 determines whether an execution instruction for a push scan was received. Specifically, when an instruction to begin executing the "Scan" function was received through operations on the user interface 16 of the MFP 10, the controller 11 determines that an execution instruction for a push scan was received (S10: YES). The execution instruction for the push scan may include information of a destination device to which scan data is to be transmitted, or the execution instruction may be issued with the destination device being designated. In this case, the destination device may be designated by the user interface 16. When the execution instruction is received locally through the user interface 16, for example, the controller 11 makes YES determination in S10. In this case, the controller 11 executes a push scan request process in S11. For example, the controller 11 transmits a push scan request to an external device (the PC 40 in this example), as the transmission device, upon receiving an operation on the user interface 16. Upon receiving this request, the external device returns a "Scan" instruction to the MFP 10. When the controller 11 receives this response, the controller 11 may determine that an instruction to execute a push scan was received. On the other hand, when an operation to start a scan was performed on an external device and the controller 11 received an execution instruction sent from the external device, the controller 11 determines that a pull scan execution instruction was received (S10: NO). In this case, the controller 11 executes a pull scan request process in S12.

Note that a "Scan" execution instruction may include information indicating whether the instruction is issued in response to an operation received through the user interface 16 or in response to an operation on an external device. Based on this information, the controller 11 may determine whether the execution instruction is for a push scan or a pull scan. Further, when the controller 11 determines that the instruction was received in response to an operation on the user interface 16, the controller 11 may determine that a push scan execution instruction was received and may execute the process in S11 without sending a request to the external device.

Figure 5:
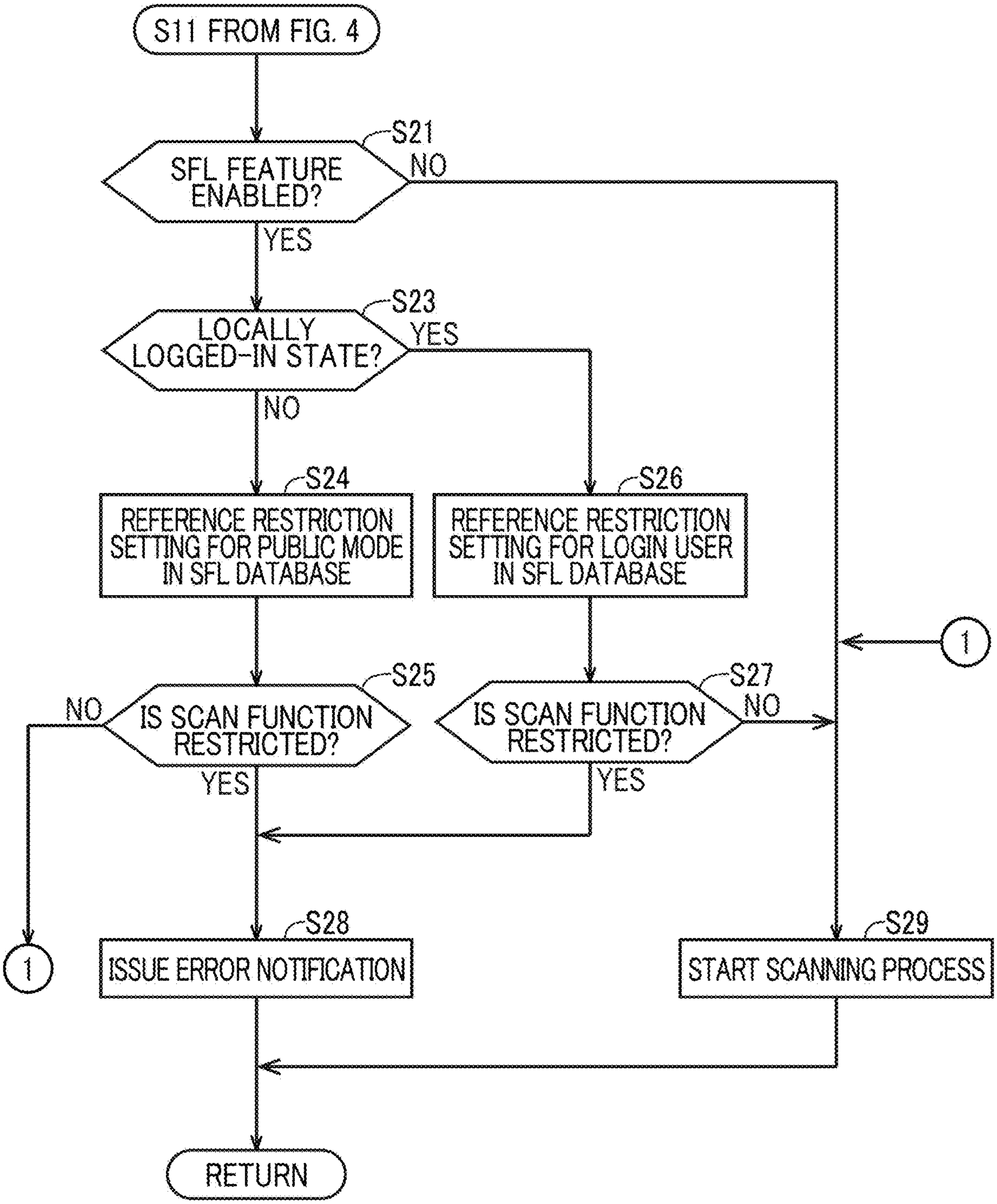
FIG. 5 is a flowchart illustrating details of a push scan request process of S11 shown in FIG. 4.

FIG. 5 shows steps in the push scan request process of S11. In this process, the controller 11 either restricts the push scan or executes the push scan without restriction depending on the restriction settings recorded in the SFL database 19. First, the process will be described for a case where the MFP 10 is in a locally logged-out state in which no user is locally logged in to the MFP 10. The locally logged-out state in which no user is locally logged in to the MFP 10 will also be referred to as the public mode for convenience. The SFL database 19 stores information specifying whether the SFL feature is enabled (ON) or disabled (OFF), for example. Hereinafter, this information will be called the SFL feature information. When the SFL feature is enabled, the MFP 10 restricts functions based on the SFL database 19 whereas when the SFL feature is disabled, the MFP does not restrict the functions. In S21 of FIG. 5, the controller 11 extracts the SFL feature information from the SFL database 19 stored in the memory 12. When the controller 11 determines that the SFL feature information is set to "disabled" (S21: NO), in S29 the controller 11 instructs the scanner 15 to start a scan in order to read a document set on the document platen. In other words, the controller 11 executes a push scan without restriction and subsequently ends the process in FIGS. 4 and 5.

The next example will assume that the SFL feature information recorded in the SFL database 19 indicates "enabled" (ON). Accordingly, the controller 11 determines that the SFL feature is enabled (S21: YES). In S23 the controller 11 checks whether the MFP 10 is in the locally logged-in state where the user has been logged in to the MFP 10 through operations on the user interface 16. Since the MFP 10 is in a locally logged-out state in this example (S23: NO), in S24 the controller 11 references the SFL database 19 to obtain the restriction setting for the "Scan" function associated with the "Public Mode" 32A.

In S25 the controller 11 determines whether the "Scan" function is restricted in the "Public Mode". As shown in FIG. 2, since the "Scan" function under "Public Mode" is unchecked, i.e., is restricted (S25: YES), in S28 the controller 11 issues an error notification indicating that the "Scan" function cannot be executed. The controller 11 issues this notification in the present embodiment by displaying an error screen on the user interface 16 indicating that the "Scan" function cannot be executed. Thus, the controller 11 places a restriction on push scans when the MFP 10 is in the locally logged-out state. In this embodiment, a restriction on the "Scan" function means that scanning processes are not executed. However, the restriction may instead involve reducing the scanning quality or may require an administrator to perform an additional special permission operation in order to execute the scan. Subsequently, the controller 11 ends the process in FIGS. 4 and 5. When the "Scan" function under "Public Mode" is checked, i.e., is permitted (S25: NO), in S29 the controller 11 instructs the scanner 15 to start the scan. That is, the scan is performed without restriction. Once the push scan is started, the scanner 15 accumulates generated data, as part of scan data in the memory 12. The controller 11 sequentially outputs or sends the data, as part of scan data, accumulated in the memory 12 to the transmission destination such as the external device (PC 40 in this example) or the USB memory mounted on the USB interface 17 in order to output the scan data.

Next, the process will be described for a case in which User A is locally logged in to the MFP 10. Since User A is in a locally logged-in state (S23: YES), in S26 the controller 11 references the restriction setting in the SFL database 19 corresponding to the "Scan" function for User A. As shown in FIG. 2, the "Scan" function under User A is unchecked, i.e., is restricted. In S27 the controller 11 determines that the "Scan" function is restricted (S27: YES), in S28 issues an error notification indicating that the scan cannot be executed, as described earlier, and subsequently ends the processes in FIGS. 4 and 5. When User B is locally logged in to the MFP 10, on the other hand, the controller 11 determines in S27 that the "Scan" function is not restricted (S27: NO) and in S29 starts the scanning processes since the restriction setting for the "Scan" function under User B is set to ON in the SFL database 19, i.e., indicates that scanning is not restricted (see FIG. 2).

Here, the local login process will be described in this example. User authentication information is recorded in the SFL database 19 for User A and User B. The recorded user authentication information includes a user ID (identifier or identification) and a password associated with the user ID. When a user ID recorded in the SFL database 19 and a password associated with the user ID are inputted via the user interface 16 in the local login process, the controller 11 places the MFP 10 in a locally logged-in state associated with the inputted user authentication information and thereafter performs various processes in the locally logged-in state. For example, when the user ID "User A" and the corresponding password are inputted, the controller 11 places the MFP 10 in a locally logged-in state associated with the inputted "User A" and performs various processes in the locally logged-in state. In other words, user authentication information recorded in the SFL database 19 is authentication information for users permitted to log in to the MFP 10. A locally logged-in state associated with user authentication information may be called a state in which the user specified by the user authentication information is logged in locally. Similarly, the locally logged-in state associated with User A may also be called a state in which User A is logged in locally. Additionally, the user specified by the user authentication information will also be called the "locally logged-in user" or the "local user" when this user is locally logged in to the MFP 10. During the local login process, the user may input the user ID and password by placing an ID card associated with the user ID registered in the SFL database 19 near or in contact with the MFP 10. Information used in the local login process may also be stored in areas of the memory 12 other than the SFL database 19. In this case, the controller 11 may reference this area of the memory 12 in the local login process and the user authentication process of FIG. 8 described later.

Next, the pull scan request process (S12 in FIG. 4) executed by the controller 11 upon receiving an instruction from the PC 40 to execute a pull scan will be described. In the pull scan request process of S12, the controller 11 determines whether to restrict the pull scan or to execute the pull scan without restriction by considering the restriction settings recorded in the SFL database 19 while requesting the authentication information from the PC 4 as needed.

Figure 6:
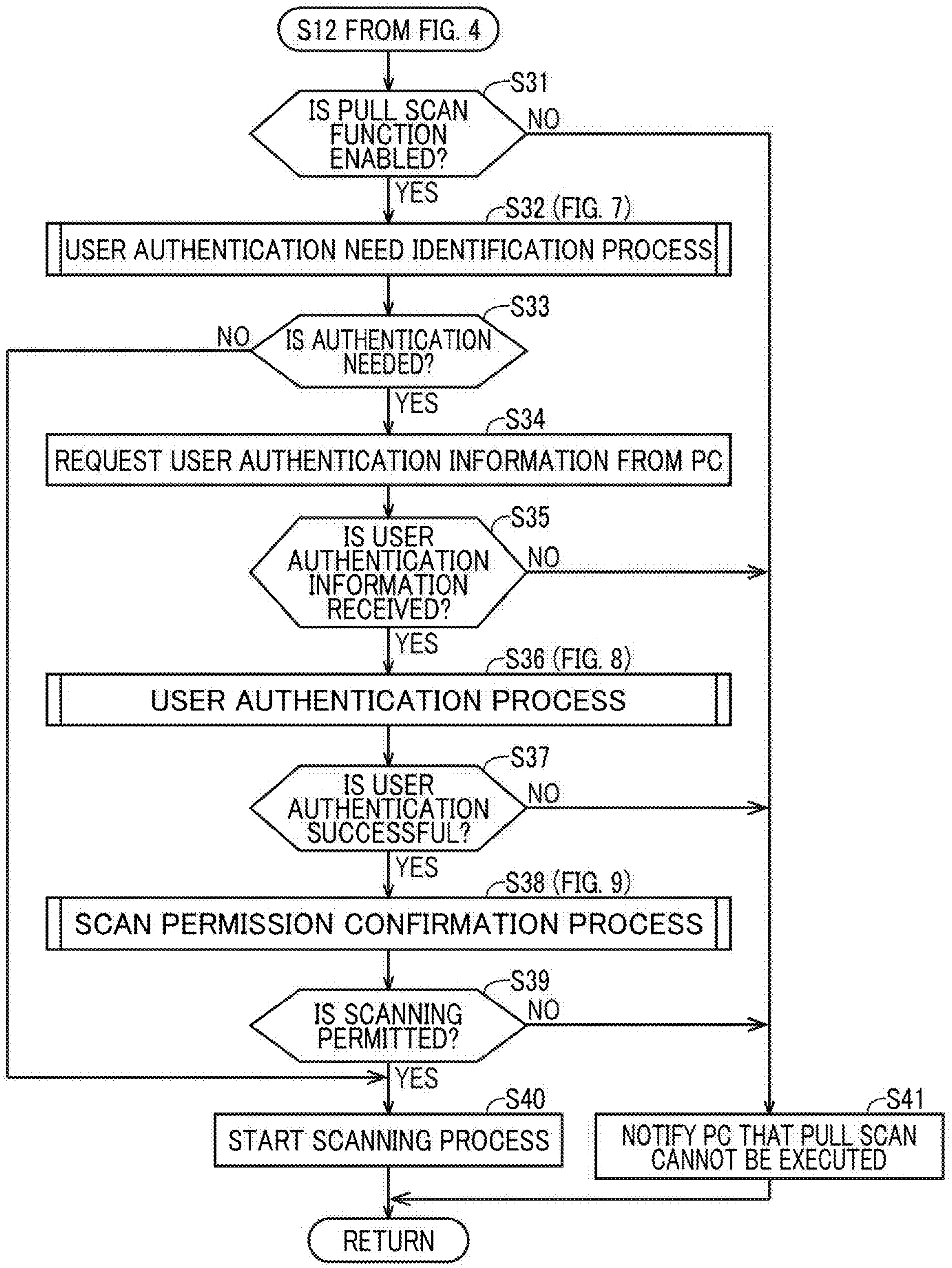
FIG. 6 is a flowchart illustrating details of a pull scan request process of S12 shown in FIG. 4.

The pull scan request process will first be described for a case in which the MFP 10 is in a locally logged-out state, i.e., when User A operates the PC 40 to execute a pull scan in the public mode. FIG. 6 shows steps in the pull scan request process of S12. In S31 at the start of the process in FIG. 6, the controller 11 determines whether the execution of pull scans has been enabled or disabled on the MFP 10. For example, the controller 11 may make this determination based on information stored in the memory 12 separate from the SFL database 19 indicating whether the pull scan function is set to "enabled" or "disabled." This example will assume that the pull scan setting is enabled (S31: YES). In this case, the controller 11 executes a user authentication need identification process in S32. In this process, the controller 11 references the restriction setting for push scans under the "Public Mode" to identify whether user authentication is required for a pull scan execution instruction. Here, when the push scan is disabled in the restriction setting for the "Public Mode", the controller 11 determines that the pull scan is also disabled. Note that when the pull scan setting is "disabled" for the MFP 10 (S31: NO), in S41 the controller 11 notifies the PC 40 that a pull scan cannot be executed. In other words, when the pull scan function is disabled on the MFP 10, the controller 11 cannot execute a pull scan regardless of who is locally logged in to the MFP 10.

Figure 7:
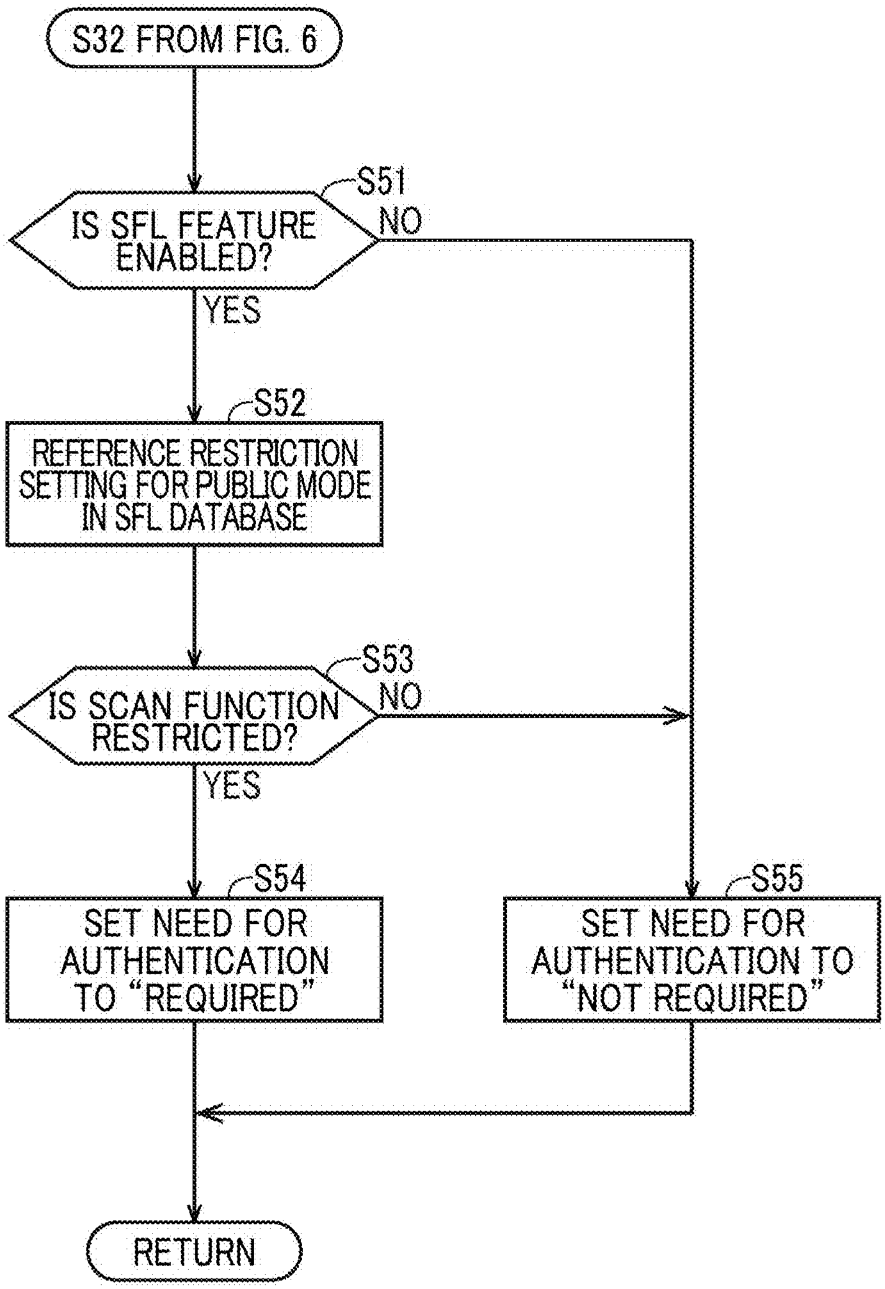
FIG. 7 is a flowchart illustrating details of a user authentication need identification process of S32 shown in FIG. 6.

FIG. 7 shows steps in the user authentication need identification process of S32. In this process of S32, the controller 11 determines whether the user authentication is required. In S51 at the beginning of the process in FIG. 7, the controller 11 references the SFL feature information in the SFL database 19 to determine whether the SFL feature has been enabled. Since this example assumes that the SFL feature information recorded in the SFL database 19 specifies "enabled" (S51: YES), in S52 the controller 11 references the SFL database 19 to obtain the restriction setting for the "Scan" function under "Public Mode" (see FIG. 2). In S53 the controller 11 determines whether the restriction setting referenced in S52 indicates that push scans are restricted in the logged-out state.

Since the "Scan" function under "Public Mode" in the example of FIG. 2 is unchecked, indicating that scanning (the pull scan) is restricted (S53: YES), in S54 the controller 11 establishes that user authentication is required for pull scan execution instructions. For example, the controller 11 sets a need determination flag to a value indicating that user authentication is required. Subsequently, the controller 11 ends the process in FIG. 7 and returns to FIG. 6.

In S33 the controller 11 confirms whether user authentication is required. In this example, since the need determination flag was set in S54 to a value indicating that user authentication is required (S33: YES), in S34 the controller 11 communicates with the PC 40 (e.g., sends an HTTPS GET request) to request user authentication information necessary for authenticating the user. Upon receiving a request for user authentication information from the MFP 10, the PC 40 transmits response data to the MFP 10 including user authentication information for the user operating the PC 40, for example. Specifically, the user authentication information includes a user ID and password. This user authentication information externally (or remotely) received in S34 is an example of the user authentication information received in association with the pull scan execution instruction. In this example, the PC 40 transmits response data that includes user authentication information for User A, but the PC 40 may send response data that includes user authentication information for the user currently logged in to the PC 40. Alternatively, the PC 40 may send response data that includes the user authentication information inputted by the user when logging in to the PC 40. The PC 40 may also prompt the user to input the user ID and password after receiving this GET request and may send the inputted user ID and password as response data. Note that the user authentication information is received externally (remotely) from the PC 40 as a response to the request transmitted in S34, but is not received locally (directly) using the user interface 16, in this example. The user authentication information may be previously received concurrently with the pull execution instruction that is subject of the determination in S1. When the user authentication information is previously received concurrently with the pull execution instruction, the controller 11 may omit the process S34 and reference the previously received user authentication to perform a determination of S35 described below. The user authentication information received in association with the pull scan execution instruction may be the user authentication information to determine whether to start the pull scan based on the pull scan execution instruction. The user authentication information received in association with the pull scan execution instruction may be referred as the user authentication information received together with the pull scan execution instruction.

The controller 11 will be unable to execute a user authentication process described later in S36 when the PC 40 does not send user authentication information in response to the GET request received from the MFP 10. Therefore, in S35 the controller 11 determines whether user authentication information was received from the PC 40 and, when user authentication was not received (S35: NO), in S41 the controller 11 notifies the PC 40 that the pull scan cannot be executed.

Figure 8:
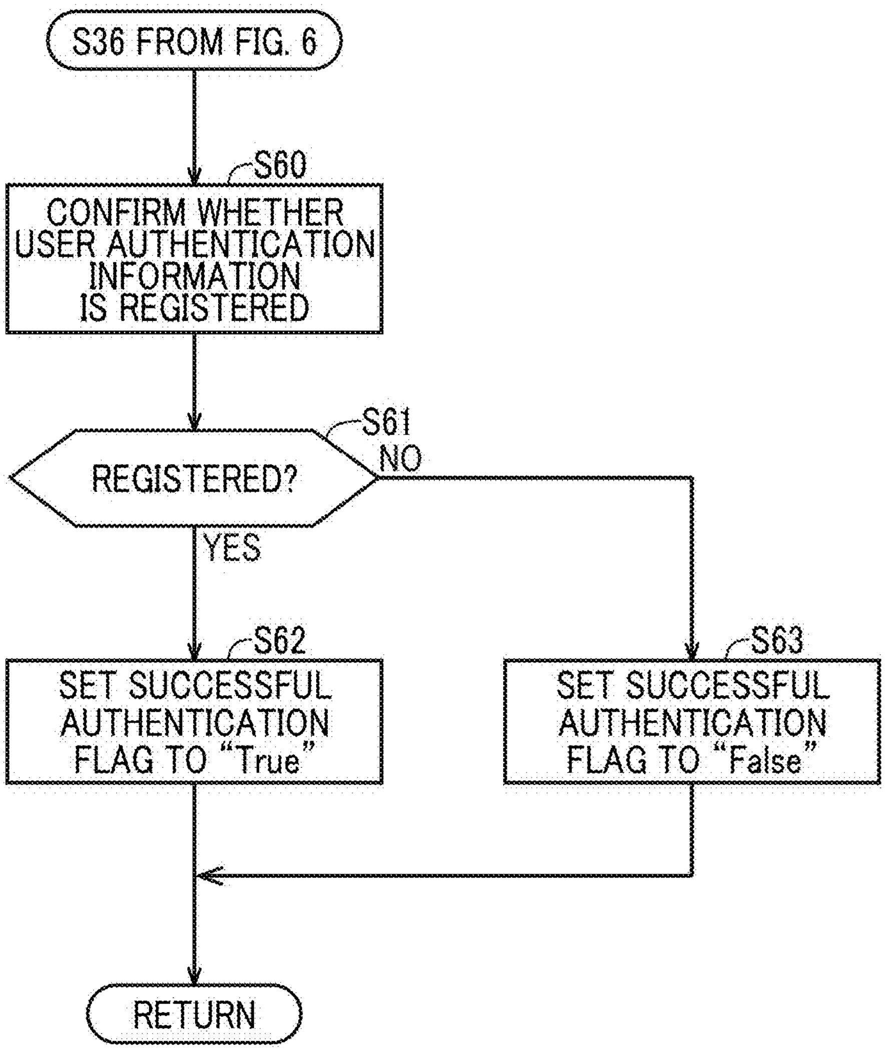
FIG. 8 is a flowchart illustrating details of a user authentication process of S36 shown in FIG. 6.

Assuming that user authentication information was received from the PC 40 in this example (S35: YES), the controller 11 executes the user authentication process of S36. FIG. 8 shows steps in this user authentication process. In S60 at the beginning of the process in FIG. 8, the controller 11 confirms whether the user authentication information received from the PC 40 (information indicating User A in this example) is registered in the SFL database 19 as information for use in the login process. As shown in FIG. 2, information specifying users that can log in to the MFP 10, i.e., user authentication information for at least User A and User B, has been registered in the SFL database 19. In S61 the controller 11 determines whether the user authentication information, i.e., the user ID and password, received from the PC 40 are registered in the SFL database 19. Since the user authentication information is registered in the SFL database 19 in this case (S61: YES), in S62 the controller 11 establishes that user authentication was successful. Because this user authentication is executed using the user authentication information remotely or externally received from the MFP 10, the user authentication may be referred to as the remote (or external) user authentication. For example, the controller 11 sets an authentication flag (successful authentication flag) specifying whether remote (external) user authentication was successful to a value indicating remote (external) user authentication succeeded (true). On the other hand, when the user authentication information received from the PC 40 is not registered in the SFL database 19 (S61: NO), in S63 the controller 11 sets the authentication flag to a value indicating that remote (external) user authentication failed (false). Subsequently, the controller 11 ends the process in FIG. 8 and returns to FIG. 6. In S37 of FIG. 6, the controller 11 determines whether remote (external) user authentication was successful. When the authentication flag is set to a value indicating that remote (external) authentication failed (false), the controller 11 determines that remote (external) user authentication failed (S37: NO) and executes the process of S41 described above. When the controller 11 does not perform the user authentication process of S36, that is, the controller 11 performs neither the process of S62 nor the process of S63 of FIG. 8, the authentication flag is not set a value indicating the user authentication was successful (true). For example, the authentication flag is set to NULL or False when the controller 11 performs neither the process of S62 nor the process of S63.

Figure 9:
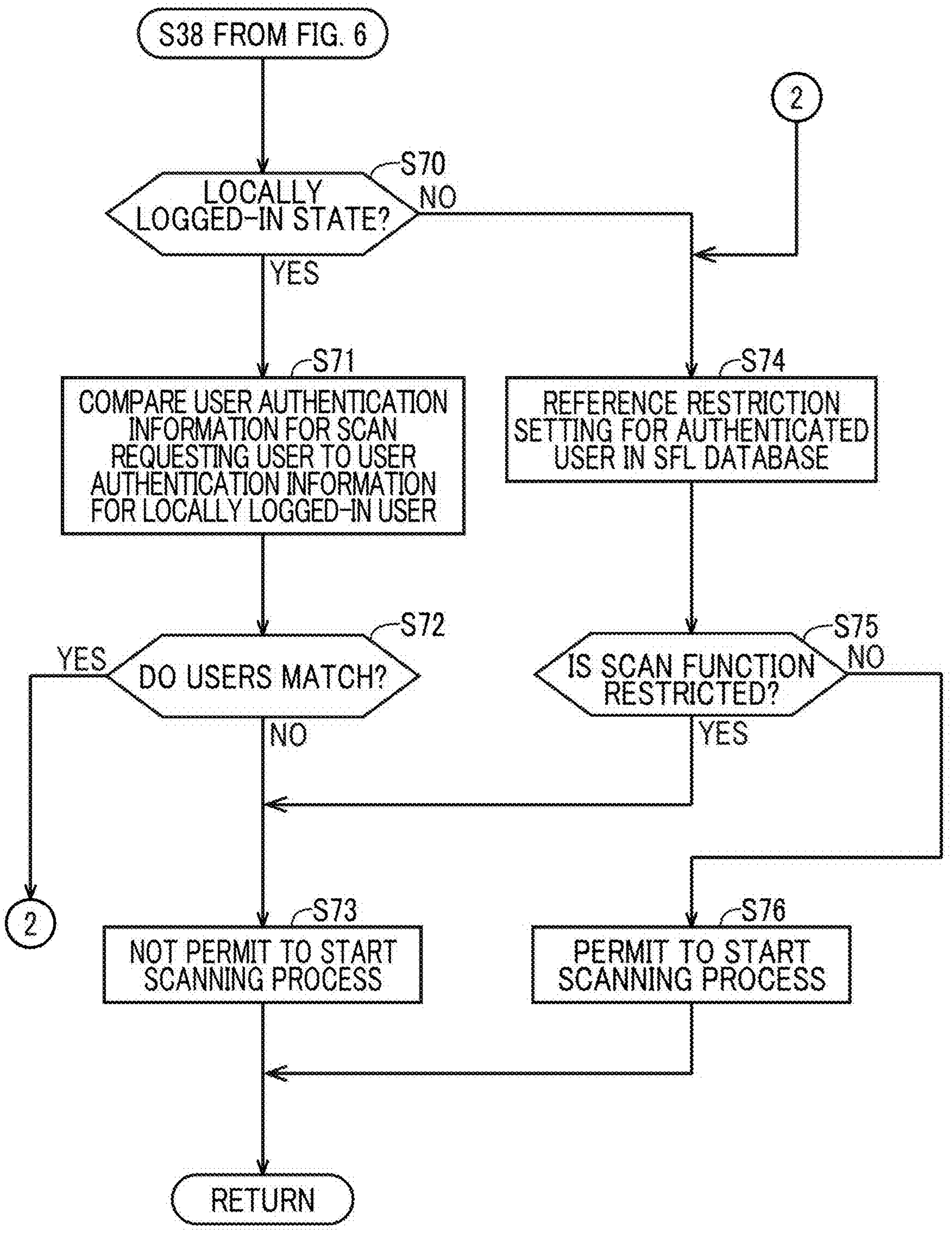
FIG. 9 is a flowchart illustrating details of a scan permission confirmation process of S38 shown in FIG. 6.

In this example, the controller 11 determines that remote user authentication was successful (S37: YES) and executes a scan permission confirmation process in S38. FIG. 9 shows steps in the scan permission confirmation process. In the scan permission confirmation process, the controller 11 determines whether to permit the pull scan by considering the user that requested the scan execution instruction and/or the restriction setting for the user whose remote user authentication was successful. In S70 at the beginning of the process in FIG. 9, the controller 11 determines whether the MFP 10 is currently in a locally logged-in state, i.e., is not in the public mode. Since the MFP 10 is in the public mode in this example (S70: NO), the controller 11 advances to S74.

In S74 the controller 11 references the restriction setting for the "Scan" function in the SFL database 19 recorded for the user who underwent successful remote user authentication in S36 described above and in S75 determines whether the "Scan" function is restricted for that user in the SFL database 19. In this example, User A was successfully authenticated in S36, and the restriction setting recorded in the SFL database 19 in association with User A for the "Scan" function is "restricted" (see FIG. 2). Therefore, in S75 the controller 11 determines that the "Scan" function is restricted (S75: YES) and in S73 sets a scan permission flag to a value indicating that the MFP 10 is not permitted to start a scan. Subsequently, the controller 11 ends the process in FIG. 9 and returns to FIG. 6.

In S39 of FIG. 6 the controller 11 confirms whether scanning is permitted. Since the scan permission flag has been set to a value indicating that the MFP 10 is not permitted to start scanning, i.e., since the scanning process is not permitted (S39: NO), the controller 11 executes the process of S41 described above. Hence, since push scans are set to "restricted" for User A, the controller 11 restricts pull scans even when remote user authentication was successful in the user authentication process of S36. Subsequently, the controller 11 ends the process of FIG. 6.

Next, the process will be described for a case in which User A is locally logged in to the MFP 10 and operates the PC 40 to execute a pull scan. In this example, the controller 11 still executes the process in S31-S37 of FIG. 6 described above. In S32 of this process, the controller 11 identifies that a push scan is restricted under the Public Mode and in S33 determines that user authentication is required (S33: YES). The controller 11 then executes the process of S38, provided that remote user authentication was successful (S37: YES).

Since the controller 11 determines in S70 of FIG. 9 that User A is in a locally logged in to the MFP 10 (S70: YES), in S71 and S72 the controller 11 determines whether the user requesting the pull scan matches the locally logged-in user. Specifically, in S71 the controller 11 compares the user authentication information used in the user authentication process of S36 described above to the user authentication information of the locally logged-in user and in S72 determines whether the users match. In other words, the controller 11 determines whether the user who operated the PC 40 to request the start of a pull scan matches the user who is locally logged in to the MFP 10. The user who requested the pull scan may also be considered the user indicated by the user authentication information received in association with the instruction to execute the pull scan.

When the controller 11 determines that the users match (S72: YES), in S74 and S75 the controller 11 determines whether the "Scan" function has been set to "restricted" for the user who was successfully authenticated in S36. Since User A is the user successfully authenticated in this example and the "Scan" function is restricted for User A in the SFL database 19 (S75: YES), in S73 the controller 11 does not permit the MFP 10 to start the scanning processes (the pull scan). After returning to FIG. 6, the controller 11 determines in S39 that the scanning process is not permitted, as described above (S39: NO), and executes the process of S41 described above.

In a case where the controller 11 determines in S72 of FIG. 9 that the users do not match (S72: NO), in S73 the controller 11 does not permit the MFP 10 to start the scanning process (the pull scan). Accordingly, in FIG. 6 the controller 11 determines that the scanning process is not permitted (S39: NO) and executes the process of S41.

In S72 the condition for determining that the user who requested the pull scan matches the locally logged-in user is not limited to their usernames being a perfect match. A "correspondence of the user authentication information" in this specification need not mean that the usernames are an exact match. For example, the controller 11 may determine that the users match when their usernames partially match. Alternatively, rather than matching usernames, the controller 11 may determine that the users match when the user authentication information essentially indicates the same user. For example, when the user authentication information for one user is a user ID while the user authentication information for the other user is a username indicating that user ID, the controller 11 may determine that the users match. In other words, the controller 11 may determine that the users match when the controller 11 verifies or confirms that the locally logged-in user (or a user account of the locally logged-in user) and the user of the received user authentication information (or a user account of the user of the received user authentication information) are identical. Here, the user account may be an account of the user identified by the user name or the user ID. Further, when the user authentication information includes information specifying a group to which the user belongs, the controller 11 may determine that the users match when they belong to the same group.

Next, the process will be described for a case in which the MFP 10 is not in a locally logged-in state (is in the Public Mode) and User B operates the PC 40 to execute a pull scan. In this example, the controller 11 still executes the process in S31-S37 of FIG. 6 described above. In S70 of FIG. 9, the controller 11 determines that the MFP 10 is in the Public Mode (S70: NO). Further, since the user who was successfully authenticated in S36 is User B in this example and the restriction setting for the "Scan" function for User B is "permitted" (S75: NO), in S76 the controller 11 sets the scan permission flag to a value indicating that the MFP 10 is permitted to start scanning processes. After returning to FIG. 6, in S39 the controller 11 determines that the value of the scan permission flag indicates that scanning is permitted (S39: YES). Accordingly, in S40 the controller 11 instructs the scanner 15 to begin scanning, as in S29 (FIG. 5) described above. In other words, since no restriction has been set on pull scans for User B, the controller 11 executes the pull scan on the condition that User B was successfully authenticated in S36. Once the pull scan is started, the scanner 15 accumulates generated data, as part of scan data in the memory 12, and the controller 11 sequentially outputs or sends the part of scan data, accumulated in the memory 12 to the PC 40 that is the transmission destination in order to output the scan data.

Next, the process will be described for a case in which User B is locally logged in to the MFP 10 and instructs to perform a pull scan. In this example, the controller 11 executes the process in S31-S37 of FIG. 6 described above. In S70 of FIG. 9, the controller 11 determines that User B is locally logged-in to the MFP 10 (S70: YES). In S71 the controller 11 compares the user that operated the PC 40 to request a pull scan to the locally logged-in user of the MFP 10 and determines in S72 whether the users match. When the users match (S72: YES), in S74 the controller 11 references the restriction setting for the "Scan" function associated with User B and in S75 determines whether "Scan" function is restricted. Since the "Scan" function is permitted in this example (S75: NO), in S76 the controller 11 permits the MFP 10 to start a pull scan. On the other hand, in a case where the controller 11 determines in S72 of FIG. 9 that the users do not match (S72: NO), in S73 the controller 11 does not permit the MFP 10 to start the pull scan. In other words, the controller 11 does not permit pull scans when the user requesting the pull scan does not match the locally logged-in user of the MFP 10, even when the user authentication for User B in this case was successful in S36 and the "Scan" function associated with User B is set to "permitted" in the SFL database 19.

Next, an example of executing a pull scan will be described for a case in which, unlike in the example of FIG. 2, the restriction setting recorded in the SFL database 19 for the "Scan" function under "Public Mode" is set to "permitted," indicating that the "Scan" function is not restricted with the SFL feature enabled. In this case, when the controller 11 determines in S31 of FIG. 6 that pull scans are enabled (S31: YES), the controller 11 executes the user authentication need identification process of S32. In S51 of the process shown in FIG. 7, the controller 11 determines that the SFL feature is enabled (ON) in the SFL database 19 (S51: YES). In S52 the controller 11 references the restriction setting for the scan function under "Public Mode" and in S53 determines whether the "Scan" function is restricted. Since the restriction setting "permitted" has been recorded in the SFL database 19 for the "Scan" function under "Public Mode" in this example (S53: NO), in S55 the controller 11 sets the need determination flag to a value indicating that remote user authentication is not required for an instruction to execute a pull scan. After returning to FIG. 6, in S33 the controller 11 determines that remote user authentication is not necessary (S33: NO), in S40 instructs the scanner 15 to begin scanning. In other words, since push scans are not restricted in the Public Mode in this example, the controller 11 does not restrict pull scans to anyone.

Next, an example will be described for a case in which the SFL feature information in the SFL database 19 indicates "disabled" (OFF). When the controller 11 determines in S31 that pull scans are set to "enabled" (S31: YES), the controller 11 executes the process of S32 shown in FIG. 7. In S51 of this process, the controller 11 determines that the SFL feature has been disabled, i.e., is OFF (S51: NO) and executes the process of S55. In other words, since the SFL feature is disabled in this example, the controller 11 does not restrict pull scans for anyone.

Next, the operational procedure performed and the screens displayed during a scanning process will be described. FIGS. 15A-15F show the transition of screens displayed on the user interface 16 from a standby screen to screens for performing local login operations and initiating a pull scan. As shown in FIG. 15A, the controller 11 displays a standby screen 60 that includes icons 61A-61E for implementing various functions, such as fax, copy, scan, and print functions, and a function for configuring settings. The standby screen 60 also includes an information field 62 for displaying login information, and a tray icon 63 for selecting the paper tray to be used for printing and other processes.

When the user touches the information field 62, the controller 11 displays a user selection screen 65 shown in FIG. 15B. The user selection screen 65 includes selection icons 66A-66C for selecting different users. The usernames displayed in the selection icons 66A-66C are the usernames registered in the SFL database 19. When the user selects one of the usernames from the selection icons 66A-66C, the controller 11 displays a password entry screen 67 shown in FIG. 15C. However, the controller may not display the password entry screen 67 when the user selects the username "Public" of the selection icon 66A. The password entry screen 67 includes input keys 68A that receive an inputted login password, a password display field 68B for displaying the password inputted via the input keys 68A, and an OK button 68C. When the user inputs a password and touches the OK button 68C, the controller 11 enters a locally logged-in state provided that the username selected in the user selection screen 65 and the password inputted in the password entry screen 67 match data recorded in the SFL database 19.

The screens in FIG. 15A-15F illustrate an example in which User A was selected and local user authentication was successful. In this case, the controller 11 displays the username for the locally logged-in user in the information field 62 of a post-login standby screen 60A, as illustrated in FIG. 15D. When the user touches the information field 62 at this time, for example, the controller 11 displays the user selection screen 65 shown in FIG. 15B so as to receive a local logout operation. That is, when the user then touches the "Public" selection icon 66A, the controller 11 executes a local logout process to shift the locally logged-out state and displays the original standby screen 60 shown in FIG. 15A.

The controller 11 can also accept an operation to change the locally logged-in user through the user selection screen 65 of FIG. 15B. For example, the controller 11 displays the user selection screen 65 when the user touches the information field 62 in the post-login standby screen 60A of FIG. 15D. When the user subsequently touches the "User A" selection icon 66B or the "User B" selection icon 66C, the controller 11 may display the password entry screen 67 shown in FIG. 15C to accept an inputted login password and may shift to a locally logged-in state when the inputted password matches data registered in the SFL database 19 for the selected user. Thus, even when the MFP 10 is in a locally logged-in state, the controller 11 may accept login operations from a separate user to change the user that is locally logged in to the MFP 10. The controller 11 may also be configured to display the username of the locally logged-in user at the position of and in place of the tray icon 63 in the post-login standby screen 60A. The controller 11 may then accept a local logout operation when the user touches the locally logged-in username. The controller 11 may also execute a local logout process without displaying the user selection screen 65 shown in FIG. 15B when the user touches the information field 62 in the standby screen 60A of FIG. 15D.

The controller 11 receives an instruction to execute a push scan in a case where the MFP 10 is in a locally logged-out state and a user operates the Scan icon 61C displayed in the standby screen 60 (see FIG. 15A) or in a case where the MFP 10 is in a locally logged-in state and a user operates the Scan icon 61C in the standby screen 60A (see FIG. 15D). When the controller 11 receives an instruction to execute a push scan (S1: YES) and determines that the push scan can be executed in the push scan request process (S11 in FIG. 4), the controller 11 initiates the scanning process (S29 shown in FIG. 5). At this time, the controller 11 displays a scan-in-progress screen 69 shown in FIG. 15E. Alternatively, when the controller 11 receives an instruction from the PC 40 to execute a pull scan (S1: YES) and determines in the pull scan request process that the scan can be executed (S12 shown in FIG. 4), the controller 11 initiates the scanning process (S40 shown in FIG. 6) and displays the scan-in-progress screen 69 shown in FIG. 15E.

As shown in FIG. 15F, after starting the scanning process in S40, the controller 11 displays a scan-in-progress screen 71 in place of the scan-in-progress screen 69 on the touchscreen 16A of the user interface 16 in a case where a prescribed condition (FIG. 11 described later) is met while the scan-in-progress screen 69 is displayed on the touchscreen 16A of the user interface 16. The scan-in-progress screen 71 includes a Cancel button 73. As shown in FIGS. 15E and 15F, the controller 11 includes information on a file name to be created in each of the scan-in-progress screen 69 and the scan-in-progress screen 71. However, as shown in FIG. 15E, the controller 11 does not include the information field 62 for performing a local logout operation in the scan-in-progress screen 69. Similarly, as shown in FIG. 15F, the controller 11 does not include the information field 62 in the scan-in-progress screen 71.

Returning to FIG. 3, in S3 the controller 11 determines whether the scanning process was completed. That is, in S3 the controller 11 determines whether the scanning process is inactive. In other words, the controller 11 determines whether the controller 11 is free from the scanning process (or determines whether the controller 11 is out of execution of the scanning process). In a case where the scanning process was completed, i.e., the scanning process is inactive (S3: YES), the controller 11 redisplays the standby screen 60A shown in FIG. 15D when in a locally logged-in state and redisplays the standby screen 60 shown in FIG. 15A when in a locally logged-out state. As described above, when the controller 11 initiates a scanning process in a locally logged-in state, the controller 11 continues to display the scan-in-progress screen 69 or the scan-in-progress screen 71 on the user interface 16 while preventing the user from executing a local logout operation or an operation to change the locally logged-in user, until the scanning process is completed (S3: YES) or a cancel operation described later is performed (S9 shown in FIG. 3: YES). Here, executing a cancellation will also be referred to as "cancelling a scan job."

Note that the method of preventing the user from performing a local logout operation or an operation to change the locally logged-in user during a scanning process is not limited to the method of displaying the scan-in-progress screen 69 or the scan-in-progress screen 71. For example, the controller 11 may continue to display the standby screen 60 or 60A with the information field 62 after initiating a scanning process while simply disabling operations on the information field 62. Alternatively, the controller 11 may be configured to accept a local logout operation or an operation to change the locally logged-in user through the user interface 16 from the start of the scanning process to the end of the process or until the process is canceled (i.e., while the scan is in progress).

Next, a process performed by the controller 11 to accept an instruction to cancel a job generated in response to a scan execution instruction received from a user (hereinafter also called a "scan job") will be described. To avoid making the description too complicated, the following description will cover a case in which only one scan job was generated. However, the process for determining whether to allow a plurality of jobs to be canceled when the plurality of scan jobs has been generated is similar to the cancellation process described below for a single scan job.

As shown in FIG. 3, after executing the scan request process of S2, in S3 the controller 11 determines whether the scanning process is inactive. Here, the controller 11 determines that the scanning process is inactive in a case where the scanning process has been completed or in a case where no scanning process has been started. Specifically, the controller 11 determines whether a push scan started in S29 (FIG. 5) or a pull scan started in S40 (FIG. 6) was completed and whether no scanning process was started. When either a push scan or a pull scan initiated in the scan request process of S2 was completed, i.e., when all scan data has been completely generated and outputted, the controller 11 makes YES determination in S3 and ends the process of FIG. 3. Further, when neither a push scan nor a pull scan was started in the scan request process of S2, i.e., when the controller 11 execute neither the process of S29 (FIG. 5) nor the process of S40 (FIG. 6), the scanning process is inactive and thus the controller 11 makes YES determination in S3 and ends the process in FIG. 3. However, when either a push scan started in S29 or a pull scan started in S40 is still in progress (S3: NO), i.e., when not all scan data has been completely generated and outputted, the scanning process is active (not inactive), the controller 11 makes NO determination in S3 and in S4 the controller 11 executes an error monitoring process.

Figure 10:
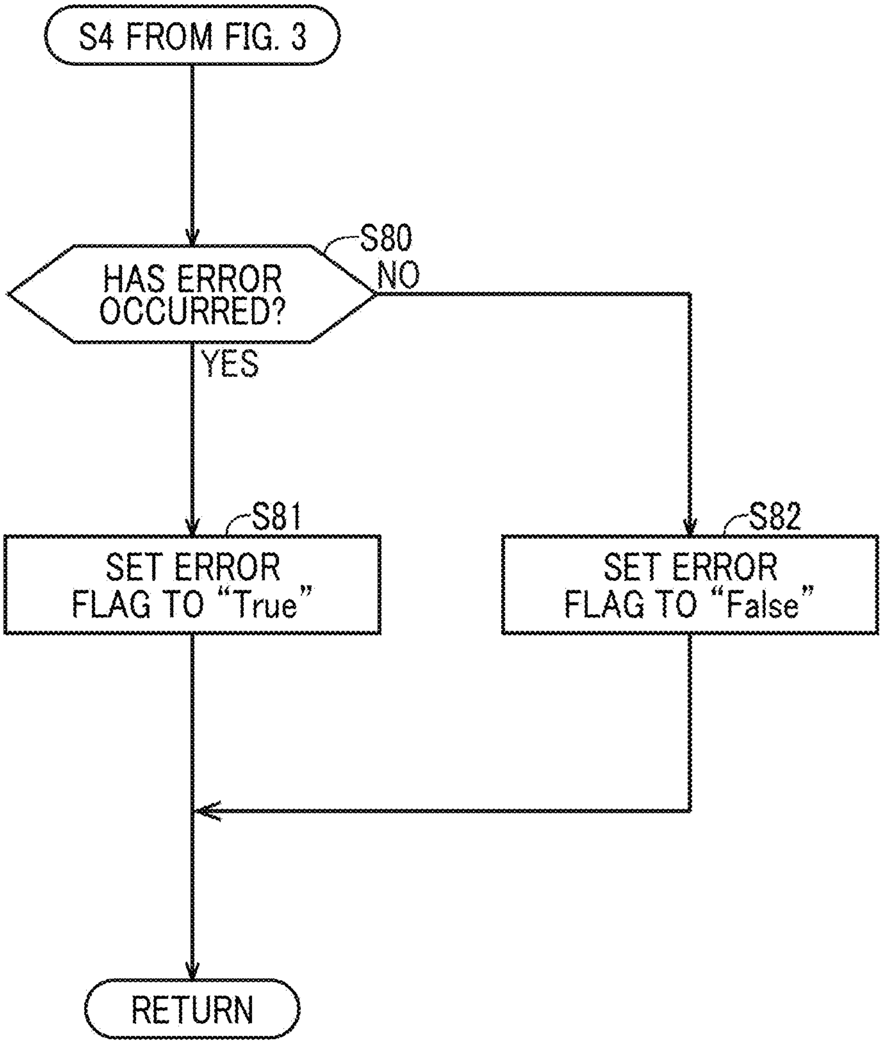
FIG. 10 is a flowchart illustrating details of an error monitoring process of S4 shown in FIG. 3.

FIG. 10 shows steps in the error monitoring process of S4. In S80 at the beginning of the process in FIG. 10, the controller 11 determines whether an error has occurred on the MFP 10. Examples of errors that the controller 11 monitors in S80 are errors in which other processes may be affected by the continuation of the scanning process, and errors that make it difficult to continue the scanning process. As a specific example, the controller 11 monitors whether the memory 12 has insufficient memory available (hereinafter also referred to as being "out of memory" or having a "full memory"). As will be described later, the controller 11 continues generating scan data based on the current scan job until an instruction to cancel the scan job is received in S6. When generated part of the scan data is accumulated in the memory 12 until a decision is made regarding whether to allow execution of the cancel operation, the work area of the memory 12 may become insufficient or the memory 12 may become full, depending on the volume of scan data and the storage capacity of the memory 12. In a case where the controller 11 temporarily halts the output of scan data in response to receiving a cancellation instruction but continues to generate and accumulate scan data in the memory 12, the possibility of the memory becoming full is even greater. When the memory becomes full, the capacity of work areas for other processes may become insufficient, causing delays or other problems with the execution of the other processes. Therefore, when the memory becomes full, the controller 11 determines in S80 that an error has occurred (S80: YES). In S81 the controller 11 sets an error flag specifying whether an error has occurred to a value indicating that an error has occurred (true). When the controller 11 determines in S80 that an error has not occurred (S80: NO), in S82 the controller 11 sets the error flag to a value indicating that an error has not occurred (false).

The error being monitored in S80 is not limited to the "out of memory" error described above. For example, when the MFP 10 is provided with an ADF (Automatic Document Feeder), the controller 11 may determine that an error has occurred in a case where sheets of the original being scanned become jammed in the ADF during conveyance. In such a case, the scanning process is difficult to continue. Alternatively, when an error has occurred in the image sensor during a reading operation of a document, the controller 11 may determine that an error has occurred since the scanning process is similarly difficult to continue.

When an occurred error is cleared or resolved, the controller 11 makes NO determination in S80.

Figure 11:
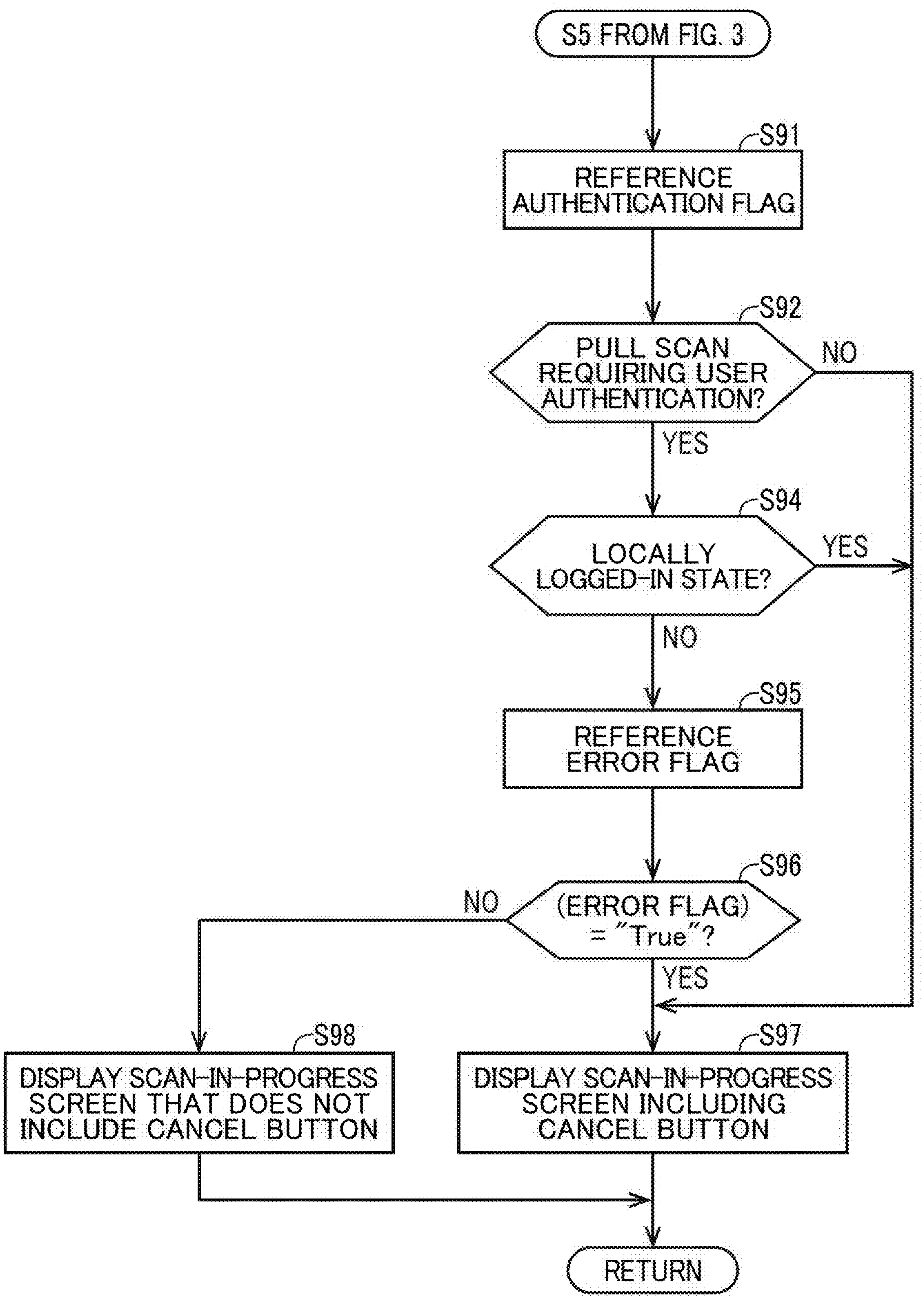
FIG. 11 is a flowchart illustrating details of a touchscreen display process of S5 shown in FIG. 3.

After completing the process of S4 in FIG. 3, in S5 the controller 11 executes a touchscreen display process. In the touchscreen display process, the controller 11 determines whether a Cancel button to cancel the scan process is to be displayed on the touch screen 16A. FIG. 11 shows steps in the touchscreen display process of S5. In S91 at the beginning of FIG. 11, the controller 11 references the authentication flag and in S92 determines whether the value of the authentication flag indicates that authentication was successful (true), i.e., whether the scan job in progress is a pull scan requiring user authentication.

In a case where the SFL feature is disabled (S51 of FIG. 7: NO) or in a case where the SFL feature is enabled (S51: YES) and the "Scan" function under "Public Mode" is not restricted (S53: NO), in S33 of FIG. 6 the controller 11 determines that user authentication is not required (S33: NO). As a result, the controller 11 does not execute the user authentication process of S36 or step S62 or S63 in FIG. 8 for setting the authentication flag. The controller 11 also does not execute S62 or S63 in FIG. 8 when the scan job is a push scan (S10: YES). Therefore, in the three cases given above, the authentication flag is not set to a value indicating "success" (true). In such cases, the controller 11 determines in S92 that the current scan job is not a pull scan requiring user authentication (S92: NO). In S97 the controller 11 displays the scan-in-progress screen 71 (see FIG. 15F) on the touchscreen 16A of the user interface 16 (see FIG. 1) and subsequently ends the process in FIG. 11. Here, the scan-in-progress screen 71 includes the Cancel button 73 for issuing an instruction to cancel the scan job. Therefore, in a case where the SFL feature is disabled, in a case where the SFL feature is enabled and the "Scan" function is not restricted under "Public Mode," or in a case where the scan job is a push scan, the controller 11 displays a software key on the touchscreen 16A of the user interface 16 for issuing a cancellation instruction.

On the other hand, in a case where the SFL feature is enabled (S51 of FIG. 7: YES), the "Scan" function under "Public Mode" is restricted (S53: YES), and the user authentication information received in association with the pull scan execution instruction is registered in the SFL database 19 so that the user is successfully authenticated (S61 of FIG. 8: YES), in S62 the controller 11 sets the authentication flag to a value indicating "success" (true). In this case, the controller 11 determines in S92 that the scan job is a pull scan requiring authentication (S92: YES), and the controller 11 advances to S94. In S94 the controller 11 determines whether the MFP 10 is in a locally logged-in state. When the MFP 10 is in a locally logged-in state (S94: YES), in S97 the controller 11 displays the scan-in-progress screen 71 with the Cancel button 73 (see FIG. 15F) on the touchscreen 16A and ends the process in FIG. 11. Hence, even when the user authentication information received in association with the pull scan execution instruction is registered in the SFL database 19 so that the user is successfully authenticated, the controller 11 can display the Cancel button 73 in the scan-in-progress screen 71 to accept a cancellation instruction through an operation on the Cancel button 73, provided that the MFP 10 is in a locally logged-in state.

In a case where the authentication flag is set to a value indicating "success" (true; S92: YES) and the MFP 10 is in a locally logged-out state (S94: NO), the controller 11 advances to S95. In this process, the controller 11 references the error flag in S95 and determines in S96 whether the value of the error flag indicates that an error has occurred (true). The process in S95 and S96 will be described for following three cases (1)-(3).

(1) The process will be described for a case in which, at the beginning of a scan, the authentication flag is set to a value indicating "success" (true; S92 of FIG. 11: YES) and the MFP 10 is in a logged-out state (S94: NO). Naturally, since no errors have occurred yet at the start of a scan, in S96 the controller 11 determines that the error flag is not set to true (S96: NO). Therefore, in S98 the controller 11 displays the scan-in-progress screen 69, which does not include the Cancel button 73, on the touchscreen 16A and subsequently ends the process in FIG. 11. As shown in FIG. 3, the controller 11 repeatedly executes the process of S5 while the scan is not completed (S3: NO) and a cancellation instruction has not been received (S6: NO), as will be described later, or while the scan has not been completed (S3: NO) and the scan job was not cancelled (S9: NO), as will be described later. During this time, the result of the determination in S92 remains unchanged (S92: YES) and the MFP 10 remains in a locally logged-out state while the scan is in progress (S94: NO). Therefore, when no error occurs, the controller 11 continues to reach a negative determination in S96 (S96: NO) and continues to display the scan-in-progress screen 69 in S98.

(2) Next, a process will be described for a case in which an error occurs after, at the beginning of a scan, the controller 11 displays the scan-in-progress screen 69. In a case where an error occurs while the controller 11 displays the scan-in-progress screen 69 through the process in (1) described above, for example, the next time the controller 11 executes the process of S5 of FIG. 3, the determination result in S92 remains unchanged (S92: YES). In this case, the MFP 10 continues to be in a locally logged-out state while the scan is in progress (S94: NO), and the controller 11 determines in S96 that the error flag is true (S96: YES). Therefore, in S97 the controller 11 switches the display on the touchscreen 16A from the scan-in-progress screen 69 to the scan-in-progress screen 71, which includes the Cancel button 73.

(3) Next, a process will be described for a case in which an error occurs after, at the beginning of a scan, the controller 11 displays the scan-in-progress screen 71. In a case where an error occurs while the scan-in-progress screen 71 is displayed at the start of a scan, the controller 11 executes the process of S5 in which the determination results in S92 and S94 do not change. That is, the determination results remain either: S92: NO; or S92: YES and S94: YES. Hence, the controller 11 continues to display the scan-in-progress screen 71 while the scan has not completed and the error has not been resolved.

As described above, while the scan has not completed (S3: NO) and a cancellation instruction has not been received (S6: NO) or while the scan has not completed (S3: NO) and the scan job was not canceled in response to a cancellation instruction (S9: NO), the determination result in S92 remains unchanged (S92: YES) and the MFP 10 remains in locally a logged-out state while the scan is in progress (S94: NO). Therefore, while the error has not been resolved, the controller 11 continues to determine in S96 that the error flag is true (S96: YES) and continues to display the scan-in-progress screen 71 in S97. When the error is cleared after the controller 11 displayed the scan-in-progress screen 71, the controller 11 determines in S96 that the error flag is not true (S96: NO), and in S98 switches the display on the touchscreen 16A from the scan-in-progress screen 71 to the scan-in-progress screen 69 by removing the Cancel button 73. In a case where another error occurs after the controller 11 switches the display to the scan-in-progress screen 69 (S96: YES), in S97 the controller 11 again switches the display from the scan-in-progress screen 69 to the scan-in-progress screen 71, which includes the Cancel button 73.

As shown in FIG. 3, after executing the process of S5 the controller 11 determines in S6 whether an instruction to cancel the scan job (hereinafter also referred to as a cancellation instruction) was received. Methods in which a user can issue a cancellation instruction for a scan job include performing an operation on the user interface 16 of the MFP 10 (hereinafter called a cancellation instruction through a user interface operation) and performing an operation on the PC 40 (hereinafter called a cancellation instruction through a PC operation). A cancellation instruction through a user interface operation involves operating the Cancel button 73 included in the scan-in-progress screen 71. A cancellation instruction through a user interface operation may also be achieved by operating the Cancel key 16B provided separately from the touchscreen 16A. Here, a cancellation instruction through an operation of the Cancel button 73 can be accepted when the scan-in-progress screen 71 is displayed. Therefore, the controller 11 can accept a cancellation instruction through a user interface operation when the user operates the Cancel key 16B (a hardware key) or the Cancel button 73 (a software key) displayed on the touchscreen 16A. While a cancellation instruction has not been received (S6: NO), the controller 11 returns to S3. As described above, the controller 11 advances to S4 while a push scan or a pull scan is still in progress (S3: NO), i.e., while the output of generated scan data is not complete.

When the controller 11 receives a cancellation instruction (S6: YES), in S7 the controller 11 executes a job cancellation request process. Here, the controller 11 may temporarily halt the output of scan data (generated part of the scan data) upon receiving a cancellation instruction in S6. For example, the controller 11 may temporarily stop reading the document with the scanner 15 and generating scan data. Alternatively, the controller 11 may temporarily stop outputting scan data (generated part of the scan data) while continuing to read the document with the scanner 15 and to generate scan data. In this case, the controller 11 may temporarily save the generated scan data (the generated part of the scan data) in the memory 12.

Figure 12:
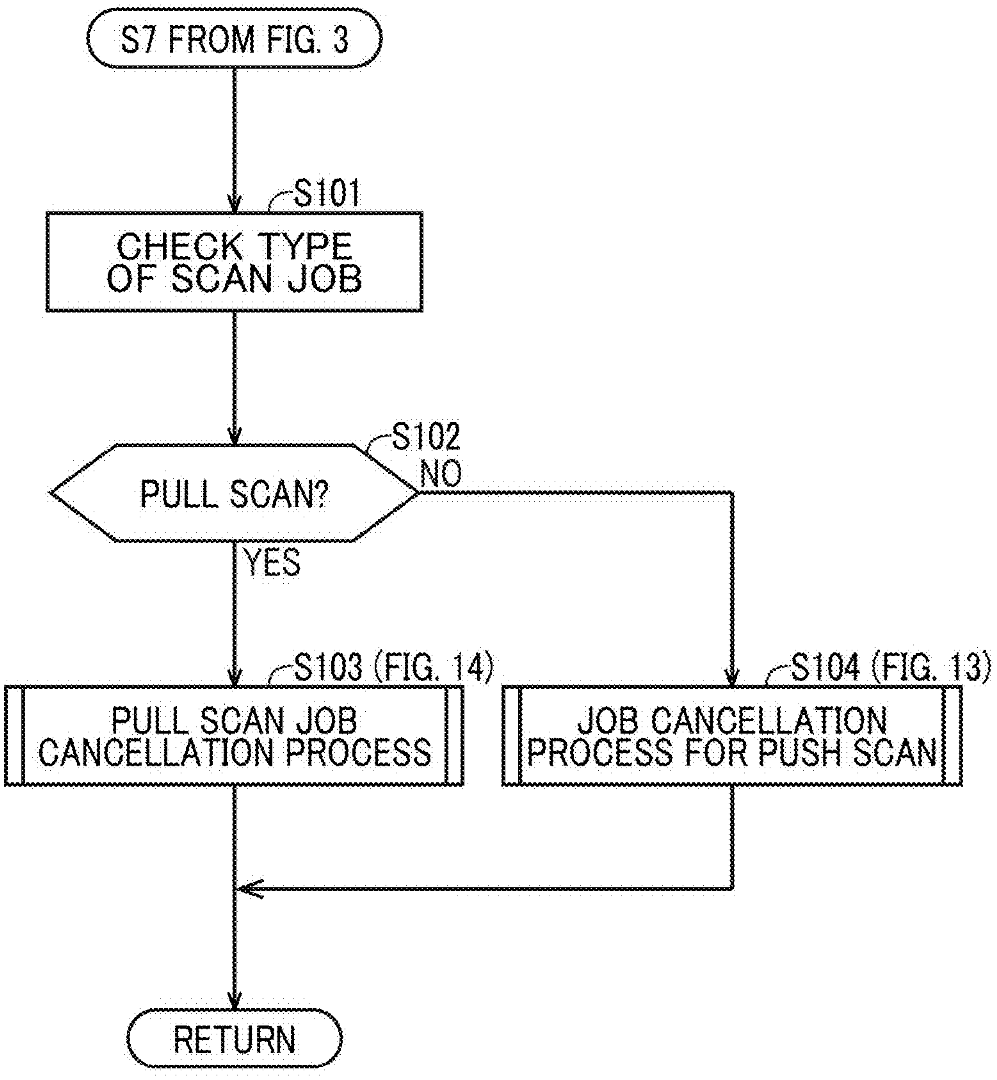
FIG. 12 is a flowchart illustrating details of a job cancellation request process of S7 of FIG. 3.

FIG. 12 shows steps in the job cancellation request process of S7. In this job cancellation request process, in a case where the cancellation instruction is an instruction to cancel the pull scan, the controller 11 determines whether to permit cancelling the pull scan before cancelling. On the other hand, in a case where the cancellation instruction is an instruction to cancel the push scan, the controller 11 cancels the push scan according to the cancellation instruction without determining whether to permit cancelling the push scan. In S101 at the beginning of the process in FIG. 12, the controller 11 checks the type of the scan job. First, this process will be described for a case in which the controller 11 received a cancellation instruction after starting a push scan. In S102, the controller 11 determines whether the type of scan job is a pull scan. In this example, the controller 11 determines that the scan job is not a pull scan but is a push scan (S102: NO) and executes a job cancellation process in S104. In a case where the controller 11 determines that the type of scan job confirmed in S101 is a pull scan (S102: YES), the controller 11 executes a pull scan job cancellation process of S103 described later.

Figure 13:
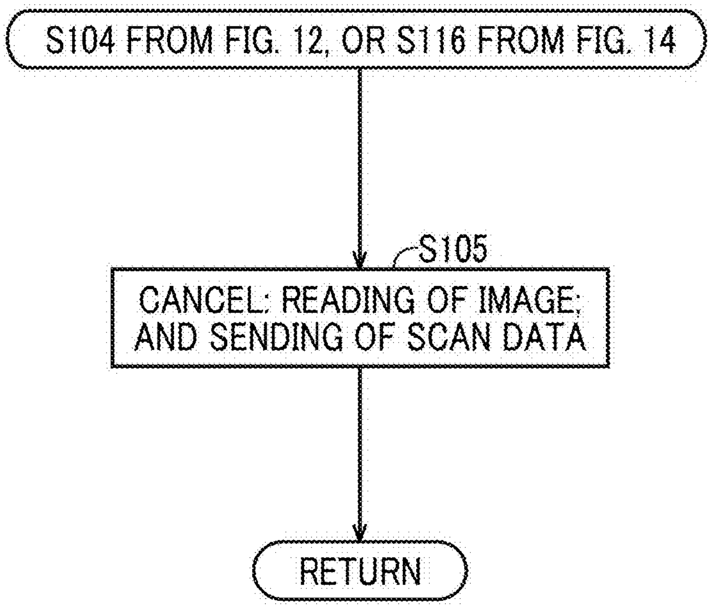
FIG. 13 is a flowchart illustrating details of a job cancellation process of S104 shown in FIGS. 12 and S116 of FIG. 14.

FIG. 13 shows steps in the job cancellation process of S104. In S105 of FIG. 13, the controller 11 cancels the scan job in progress. In this case, the canceled scan job is a push scan. Here, the controller 11 completely ends any temporarily halted processes for outputting scan data and the like and discards any generated scan data (the generated part of the scan data). After completing the process of S105, the controller 11 ends the process in FIG. 12 and returns to FIG. 3. After executing the process of S7 in FIG. 3, in S9 the controller 11 determines whether the scan job was canceled, i.e., whether the process of S105 in FIG. 13 was executed. When the scan job was canceled (S9: YES), the controller 11 ends the process in FIG. 3. In this case, the controller 11 stops displaying the scan-in-progress screen 71 shown in FIG. 15F, and redisplays the standby screen 60A in FIG. 15D when in a locally logged-in state or the standby screen 60 in FIG. 15A when in a locally logged-out state. In the following examples as well, when cancelling a scan job (S9: YES), the controller 11 may stop displaying the scan-in-progress screen 69 or the scan-in-progress screen 71 and redisplay the standby screen 60A while in a locally logged-in state or the standby screen 60 while in a locally logged-out state. The controller 11 may also execute the process in FIGS. 12 and 13 without temporarily halting the scan job (without temporarily halting the outputting of scan data and the like) after reaching a positive determination in S6.

Hence, in the case of push scans, the controller 11 cancels the scan in response to a cancellation instruction, regardless of whether the cancellation instruction was received through a user interface operation with the Cancel key 16B, a user interface operation with the Cancel button 73, or a PC operation. As described above, the user must operate the user interface 16 of the MFP 10 to instruct the MFP 10 to begin a push scan. Therefore, when the cancellation instruction is received through a user interface operation, it is highly likely that the user instructing the push scan in front of the user interface 16 also operated the user interface 16 to issue the cancellation instruction. Moreover, for the push scan, there is essentially no means for accepting an instruction to cancel a scan job other than the device associated with that scan job. Specifically, there is no means for receiving an instruction to cancel a scan job other than the device that accepts the instruction to start scanning and the device that performs the scan job in response to this instruction. In other words, a cancellation instruction is essentially not issued from another device not involved in the execution of the scan job for the push scan. In the case of a push scan, the MFP 10 is both the device that receives the instruction to start scanning and the device that executes the scan job. Therefore, it is appropriate to provide only the MFP 10 with means for accepting cancellation instructions for scan jobs of push scans. Hence, when the MFP 10 receives a cancellation instruction for a push scan, the MFP 10 cancels this scan job, regardless of whether or not the MFP 10 is in a locally logged-in state. That is, when the MFP 10 receives a cancellation instruction for a push scan, the MFP 10 cancels the scan job without confirming in S113 of FIG. 14 (described later) whether or not the MFP is in a locally logged in state and without confirming in S115 whether or not an error has occurred.

Next, the process will be described for a case in which a cancellation instruction is issued through a PC operation after a pull scan was started. In this case, the controller 11 determines in S102 of FIG. 12 that the scan job is a pull scan (S102: YES) and in S103 executes the pull scan job cancellation process shown in FIG. 14. In S110 of FIG. 14 at the beginning of the process in FIG. 14, the controller 11 checks the source of the job cancellation request, i.e., how the cancellation instruction was issued, and in S111 determines whether the cancellation instruction was issued through a PC operation. When the cancellation instruction was issued through the user interface operation using the user interface 16 and not a PC operation (S111: NO), the controller 11 advances to S112.

However, since the cancellation instruction was issued through a PC operation in this example (S111: YES), in S116 the controller 11 executes the job cancellation process of FIG. 13 described above. In the case of a pull scan, the PC 40 is the device that receives the user instruction to start the scan. Accordingly, with pull scans in the present embodiment, the PC 40 that receives the user instruction to start the scan is the only device other than the MFP 10 from which the MFP 10 receives a cancellation instruction for the scan job initiated by that start instruction. Therefore, when the MFP 10 is executing a pull scan, a cancellation instruction through a PC operation can only be sent from the same PC 40 (external device) that initiated the scan. That is, the MFP 10 only accepts a cancellation instruction when the cancellation instruction has been transmitted from a device (the PC 40) that has initiated the pull scan (that has transmitted the execution instruction of the pull scan). In other words, when any user starts a pull scan through an instruction on the PC 40, a different user operating a different PC cannot cancel the pull scan. Therefore, even when a cancellation instruction is issued through a PC operation, it is highly likely that the user who issued the instruction to start the pull scan also issued the cancellation instruction from the same PC 40. Accordingly, in S105 (in S116 of FIG. 14) the controller 11 cancels the scan job for the pull scan without confirming in S113 whether or not the MFP 10 is in a locally logged-in state and without confirming in S115 whether or not an error has occurred, when the cancellation instruction was issued through a PC operation.

Next, the process will be described for two cases. The first case is a case in which a cancellation instruction was issued through a user interface operation after a pull scan was started while the SFL feature is disabled (S51 of FIG. 7: NO). The second case is a case in which a cancellation instruction was issued through a user interface operation after a pull scan was started while the SFL feature is enabled (S51: YES) and the “Scan” function under “Public Mode” is not restricted (S53: NO). As described above, the authentication flag is not set to a value indicating “success” (true) in this case.

In this example, the controller 11 determines in S6 of FIG. 3 that a cancellation instruction was received (S6: YES), determines in S102 of FIG. 12 that the scan job is a pull scan (S102: YES), determines in S111 of FIG. 14 that the cancellation instruction was not issued through a PC operation (S111: NO), and advances to S112. As in S92 (FIG. 11), in S112 the controller 11 determines whether the scan job is a pull scan requiring user authentication. Since the authentication flag is not set to a value indicating “success” (true) in this example (S112: NO), in S116 the controller 11 executes the job cancellation process. Therefore, in the two cases given above, when the cancellation instruction is received through a user interface operation targeting a pull scan, the controller 11 cancels the scan job in S105 without checking whether the MFP 10 is in a locally logged-in state (S113) or whether an error has occurred (S115), as will be described later. The controller 11 can accept a cancellation instruction through the Cancel key 16B or the Cancel button 73 displayed in the scan-in-progress screen 71 displayed in S97 that is performed in response to the NO determination made in S92.

Next, the process will be described for a pull scan when the SFL feature is enabled (S51 of FIG. 7: YES), the "Scan" function under "Public Mode" is set to restricted (S53: YES), and the user authentication information received in association with the pull scan execution instruction is registered in the SFL database 19 so that user authentication is successful (S61 of FIG. 8: YES). Hereinafter, the pull scan started under this condition is referred to as an "authenticated pull scan." First, the process will be described for a case in which a cancellation instruction was issued through a user interface operation while the MFP 10 was in a locally logged-in state after an authenticated pull scan was initiated. In this example, the controller 11 determines in S6 of FIG. 3 that a cancellation instruction was received (S6: YES), determines in S102 of FIG. 12 that the scan job is a pull scan (S102: YES), determines in S111 of FIG. 14 that the cancellation instruction was not issued through a PC operation (S111: NO), and advances to S112. Since the authentication flag is set to a value indicating "success" (true) in this case, the controller 11 determines that the scan job is a pull scan requiring authentication (S112: YES) and in S113 determines whether the MFP 10 is in a locally logged-in state. Since the MFP 10 is in a locally logged-in state in this example (S113: YES), in S116 the controller 11 executes the job cancellation process. Hence, when a cancellation instruction is issued through a user interface operation for an authenticated pull scan while the MFP 10 is in a locally logged-in state, in S105 the controller 11 cancels the scan job without checking in S115 described later whether an error has occurred. The controller 11 also accepts a cancellation instruction through the Cancel key 16B or the Cancel button 73 displayed in the scan-in-progress screen 71 displayed in S97 that is performed in response to the NO determination made in S92. After a cancellation instruction is issued through a user interface operation for an authenticated pull scan while the MFP 10 is in a locally logged-in state, the controller 11 may remove the Cancel button 73 from the displayed screen so as not to accept another cancellation instruction.

Next, the process will be described for a case in which: an error has occurred with the MFP 10 in a locally logged-out state after the controller 11 started an authenticated pull scan; and thereafter a cancellation instruction is received through a user interface operation. In this case, the controller 11 executes the same process described in the above example, determines in S112 of FIG. 14 that a pull scan requiring user authentication was received (S112: YES), but determines in S113 that the MFP 10 is not in a locally logged-in state (S113: NO) and advances to S114. In S114 the controller 11 references the error flag and in S115 determines based on the error flag that an error has occurred. Since an error has occurred in this case (S115: YES), in S116 the controller 11 executes the job cancellation process. Hence, when an error has occurred and a cancellation instruction was received through a user interface operation for an authenticated pull scan while the MFP 10 is in a locally logged-out state, in S105 the controller 11 cancels the scan job. The controller 11 also accepts a cancellation instruction through the Cancel button 73 in the scan-in-progress screen 71 displayed in S97 that is performed in response to the YES determination made in S96. Note that the controller 11 may be configured to immediately terminate a scan job in the event of a serious error or other event requiring the immediate termination of the scan job. In such an event, the controller 11 may terminate the scan job without receiving a cancellation instruction.

Next, the above process will be described for a case in which: no error has occurred with the MFP 10 in a locally logged-out state after the controller 11 initiated an authenticated pull scan; and thereafter a cancellation instruction is received through a user interface operation. In this example, the controller 11 performs the same process as for the above case in which an error has occurred up to step S115 (S6: YES, S102: YES, S111: NO, S112: YES, S113: NO). However, the controller 11 advances to the process in S117 in this case since an error has not occurred (S115: NO).

In S117 the controller 11 continues executing the scan job with the scanner 15 rather than cancelling the job. The controller 11 resumes outputting (sending) scan data (generated part of the scan data) and the like, which was temporarily halted, and subsequently ends the process in FIG. 14. The controller 11 also ends the process in FIG. 12. After completing the process of S7 in FIG. 3, in S9 the controller 11 determines whether the scan job was canceled. Since the scan job was not canceled in this case (S9: NO), i.e., since the controller 11 executed the process of S117, the controller 11 returns to S3 and repeats the above process. Thus, the controller 11 continues the scan job for a pull scan without cancelling the scan job. As described above, in a case where the MFP 10 has been in a locally logged-out state when executing an authenticated pull scan (S94 of FIG. 11: NO) and an error has not occurred (S96: NO), the controller 11 does not display the Cancel button 73 and does not accept a cancellation instruction through a software key. As long as an error does not occur (S115: NO), the controller 11 does not cancel the scan job, even when the Cancel key 16B, which is a hardware key, is operated.

When the scan job was not canceled in response to a cancellation instruction (S9: NO), the controller 11 continues scanning until the scan is completed (S3: YES), provided that another cancellation instruction is not issued. When another cancellation instruction is received (S6: YES), in S7 the controller 11 once again determines whether to permit cancellation. In a case where the scan job is not completed when repeating the process from S3 (S3: NO), the controller 11 again executes the process of S4 to determine whether an error has occurred and executes the process of S5 to determine whether the Cancel button 73 is to be displayed. The controller 11 may completely halts executing the scan job, instead of temporarily halting the scan job, when determining in S6 that a cancellation instruction was received. In this case, the process of S105 (FIG. 13) can be omitted.

Either the scan-in-progress screen 69 or the scan-in-progress screen 71 is displayed during a scan. In a case where the user requesting the pull scan is successfully authenticated and the pull scan is started while the MFP 10 is in a locally logged-out state, the user cannot operate the standby screen 60 in FIG. 15A to locally log in to the MFP 10. Similarly, in a case where the user requesting the pull scan is successfully authenticated and the pull scan begins when the MFP 10 is in a locally logged-in state, the user cannot operate the standby screen 60A in FIG. 15D to locally log out of the MFP 10 or change the locally logged-in user. Hence, by displaying the scan-in-progress screen 69 or scan-in-progress screen 71 during a pull scan, a user other than the user who issued the instruction to start the pull scan is restricted from shifting the MFP 10 into a locally logged-out state or a newly locally logged-in state through the standby screen 60 or standby screen 60A, in order to operate the MFP 10.

The embodiment described above can obtain the following effects. When the controller 11 of the MFP 10 receives user authentication information in association with an instruction to execute a pull scan (S92 of FIG. 11: YES), the controller 11 displays the scan-in-progress screen 69 that does not contain the Cancel button 73 on the touchscreen 16A (S98). Alternatively, when the controller 11 does not receive user authentication information in association with an instruction to execute a pull scan (S92: NO), the controller 11 displays the scan-in-progress screen 71 containing the Cancel button 73 on the touchscreen 16A and cancels the pull scan in progress upon receiving an operation through the Cancel button 73 (S111 of FIG. 14: NO, S112: NO, S116). Cases in which user authentication information is not received may include cases in which user authentication information is not sent from the PC 40 because the information was not requested by the MFP 10, but also cases in which the PC 40 sends user authentication information (a username and password) despite the MFP 10 not requesting this information but the controller 11 does not accept the information as user authentication information.

Figure 14:
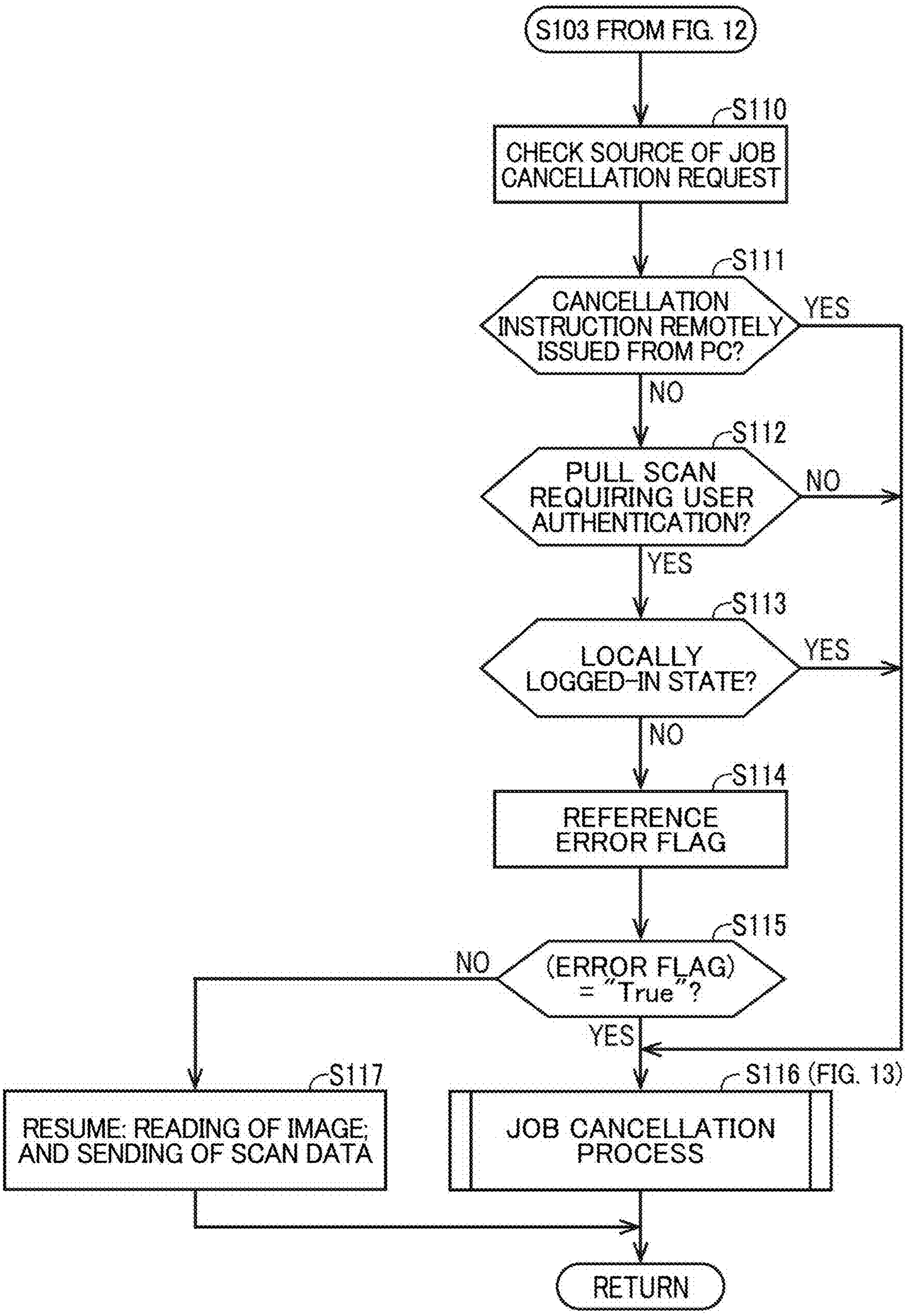
FIG. 14 is a flowchart illustrating details of a pull scan job cancellation process of S103 shown in FIG. 12.

Further, when the controller 11 received user authentication information in association with an instruction to execute a pull scan (S112 of FIG. 14: YES), the controller 11 does not cancel the pull scan while the scan is in progress, even when the Cancel key 16B is operated. When user authentication information was not received (S112: NO), the controller 11 cancels the pull scan (S116) in response to an operation on the Cancel key 16B.

When user authentication information is received in association with the pull scan execution instruction, users other than the user specified by the user authentication information can be prohibited from cancelling the pull scan by not displaying the Cancel button 73. Further, users other than the user specified by the user authentication information can be prohibited from cancelling the pull scan by not allowing a user to issue a cancellation instruction through the Cancel key 16B. When user authentication information is not received in association with a pull scan execution instruction, the controller 11 can allow users to cancel the pull scan by displaying the Cancel button 73. In this case, a user can also cancel the pull scan by operating the Cancel key 16B. Thus, cancellation instructions issued through user operations can be permitted for scan jobs not accompanied by user authentication information.

Upon receiving a pull scan execution instruction in association with user authentication information while the MFP 10 is in a locally logged-in state, the controller 11 starts the pull scan (S76 of FIG. 9) when the user authentication information for the locally logged-in user corresponds to the user authentication information received in association with the pull scan execution instruction (S72: NO) and does not start the pull scan when the information does not correspond (S72: YES, S73). The controller 11 displays the Cancel button 73 (S94 of FIG. 11: YES, S97) and accepts a cancellation instruction through an operation on the Cancel button 73 to cancel the pull scan (S113 of FIG. 14: YES, S116), even when user authentication information is received in association with the instruction to execute the pull scan, provided that the pull scan was started under a condition that the user authentication information of the locally logged-in user corresponds to the user authentication information received in association with the execution instruction. In this case, the controller 11 also cancels the pull scan when the Cancel key 16B is operated (S113: YES, S116).

In this way, even when the controller 11 receives user authentication information, the controller 11 accepts a cancellation instruction through the Cancel button 73 or the Cancel key 16B and cancels the scan job, provided that the MFP 10 is in a locally logged-in state. As described above, when the controller 11 starts a scan process while the MFP 10 is in a locally logged-in state, the controller 11 displays the scan-in-progress screen 69 or scan-in-progress screen 71 on the user interface 16 until the scan process has completed or a cancellation is performed so that a local logout operation or an operation to change the locally logged-in user cannot be performed. Thus, users other than the locally logged-in user cannot locally log in to the MFP 10 or change the locally logged-in user. Therefore, when the MFP 10 is in a locally logged-in state before the pull scan is started, the user who locally logged in to the MFP 10 by operating the user interface 16 is the user who requested the pull scan (S72 of FIG. 9: NO). Accordingly, when the pull scan was started while the MFP 10 is in a locally logged-in state, the controller 11 displays the Cancel button 73 in the scan-in-progress screen 71 (S94 of FIG. 11: YES, S97) and accepts a cancellation instruction through the Cancel button 73 to cancel the scan job (S113 of FIG. 14: YES, S116). In this case, the controller 11 also cancels the scan job when the Cancel key 16B is operated (S113: YES, S116). When the MFP 10 is in a locally logged-in state in this way, the controller 11 can allow the appropriate user to cancel the scan job by permitting a cancellation instruction through a user interface operation.

After the controller 11 starts a pull scan upon determining that the user authentication information for the locally logged-in user corresponds to the user authentication information received in association with the instruction to execute the pull scan (S72: YES), the controller 11 displays the scan-in-progress screen 69 or scan-in-progress screen 71 and does not accept an operation through the touchscreen 16A to change the locally logged-in user or an operation to locally log out until the pull scan is completed or canceled. By preventing the locally logged-in user from being changed in this way, the controller 11 can restrict other users from executing a scan or other process while a pull scan is in progress. Further, if the MFP 10 were to be shifted into a locally logged-out state, the user who requested the pull scan may be unable to cancel the scan job (S94: NO, S113: NO). Therefore, by prohibiting the execution of a local logout operation, the controller 11 can ensure that the user who requested the pull scan has the means to issue a cancellation instruction. The controller 11 may be configured not to accept one or more of the operations to modify the locally logged-in user and to locally log out via the touchscreen 16A until the pull scan is completed or canceled.

Further, after the controller 11 starts a pull scan as a result of user authentication information being received in association with an instruction to execute a pull scan while the MFP 10 is in a locally logged-out state (S70 of FIG. 9: NO), the controller 11 displays the scan-in-progress screen 69 or scan-in-progress screen 71 and does not accept a local login operation through the touchscreen 16A until the pull scan is completed or canceled. Thus, when the MFP 10 is in a locally logged-out state, the controller 11 can prohibit users other than the user requesting the pull scan from locally logging in and issuing a cancellation instruction by preventing the MFP 10 from being shifted into a locally logged-in state.

The controller 11 also determines whether an error has occurred on the MFP 10 (S4 of FIG. 3, S80 of FIG. 10). Even in a case where the controller 11 received user authentication information in association with a pull scan execution instruction (S92 of FIG. 11: YES), the controller 11 displays the Cancel button 73 (S97) when an error occurs after starting the pull scan (S96: YES). When the controller 11 receives an operation on the displayed Cancel button 73, the controller 11 cancels the pull scan in progress (S115 of FIG. 14: YES, S116). Further, even when the controller 11 has received user authentication information in association with an instruction to execute a pull scan, the controller 11 cancels the pull scan (S115 of FIG. 14: YES, S116) in response to an operation on the Cancel key 16B when an error has occurred.

With this configuration, the controller 11 can provide the user means to quickly terminate a scan job during which an error has occurred. In a case where an error such as an out-of-memory error occurs after the controller 11 has started a pull scan, the controller 11 can prevent the pull scan from continuing in this error state by permitting cancellation through the Cancel button 73 or Cancel key 16B. This can prevent the controller 11 from transmitting scan data with reading errors. In other words, the controller 11 can continue executing a scan job to the extent possible, such as by continuing to send scan data that has been generated, even when an error has occurred, until the user issues a cancellation instruction. In the event of an error, such as a paper jam in the ADF, the user can choose whether to issue a cancellation instruction or to continue the scan job after removing the cause of the error. For example, the user can continue the scan job after clearing a paper jam in the ADF.

After starting a push scan, the controller 11 also displays the Cancel button 73 (S92 of FIG. 11: NO, S97) and accepts a cancellation instruction through the Cancel button 73 to cancel the push scan (S112 of FIG. 14: NO, S116). After starting a push scan, the controller 11 also accepts a cancellation instruction through the Cancel key 16B to cancel the push scan (S112: NO, S116). Since push scan operations must be performed through the user interface 16, a user instructing cancellation through an operation on the user interface 16 is highly likely the same user who instructed execution of the push scan. Therefore, by allowing a cancellation instruction to be issued through the Cancel button 73 or the Cancel key 16B for push scans, the controller 11 can ensure that cancellation is performed by the appropriate user.

When a cancellation instruction is received through a PC operation (S111 of FIG. 14: YES), the controller 11 cancels the pull scan in progress (S116), even when user authentication information was received in association with the instruction to execute the pull scan. After starting the pull scan, the controller 11 does not accept a cancellation instruction for the pull scan from any device other than the PC 40 that sent the execution instruction. In other words, when a cancellation instruction is received after the controller 11 has started a pull scan, the cancellation instruction must be from the same PC 40 that issued the execution instruction. By permitting cancellation in this case, the controller 11 can ensure that the appropriate user has issued the cancellation instruction.

Variations of the Embodiment

In the embodiment described above, the controller 11 requires user authentication for a pull scan when the scan function recorded in the SFL database 19 for the "Public Mode," i.e., the restriction setting for push scans in a locally logged-out state is "restricted" (S53 of FIG. 7: YES). As a variation, when the restriction setting recorded in the SFL database 19 for the "Scan" function associated with all registered users is "restricted", the controller 11 may make a YES determination in S53 and require user authentication for a pull scan. When the restriction setting recorded in the SFL database 19 for the "Scan" function is "restricted" for a specific predetermined user, the controller 11 may make a YES determination in S53 and require user authentication for pull scans.

The controller 11 may execute the user authentication process in S36 of FIG. 6 and the scan permission confirmation process in S38 as follows. In this example, within the user authentication process of S36, the controller 11 determines whether the user who operated the PC 40 matches the user locally logged in to the MFP 10 (S70-S72 of FIG. 9). First, in S60 (FIG. 8) of the user authentication process executed in S36, the controller 11 checks whether the user authentication information received from the PC 40 is registered in the memory 12 as an authentication target. When the user authentication information is registered as an authentication target (S61: YES), the controller 11 performs the process of S70 described in FIG. 9, that is, the controller 11 determines whether the user has completed locally logging in to the MFP 10. When the user is already locally logged in to the MFP 10 (S70: YES), as the process of S71 and S72 the controller 11 determines whether the user requesting the pull scan matches the locally logged-in user. When the controller 11 determines that the users match (S72: YES), then subsequently in S62 of FIG. 8 the controller 11 sets a flag indicating that user authentication was successful and advances to S37. Even when the user has not completed locally logging in to the MFP 10 (S70: NO), the controller 11 advances to S62 to set the authentication flag to a value indicating that user authentication was successful, and subsequently advances to S37. However, when the controller 11 determines that the users do not match (S72: NO), in S63 the controller 11 sets the authentication flag to a value indicating that user authentication failed, and subsequently advances to S37.

Subsequently, when the controller 11 determines in S37 of FIG. 6 that user authentication was successful (S37: YES), in S38 the controller 11 performs the scan permission confirmation process. In the scan permission confirmation process of S38, the controller 11 does not execute the process in S70-S72 described in the embodiment since this process has already been executed in the user authentication process of S36. Specifically, in S74 the controller 11 references the restriction setting for the "Scan" function corresponding to the user whose authentication was successful. When the restriction setting "restricted" has been recorded in the SFL database 19 for the "Scan" function corresponding to this user (S75: YES), the controller 11 advances to S73 and does not permit the scan process (pull scan) to begin. However, when the restriction setting "restricted" is not recorded in the SFL database 19 for the "Scan" function associated with this user (S75: NO), the controller 11 advances to S76 to permit the pull scan to begin.

Other Embodiments

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The order, contents, and the like of the processes shown in FIGS. 3 through 14 of the above embodiment are merely examples. In the embodiment described above, the controller 11 checks the registration of the user requesting a pull scan in S36 of FIG. 6 (S61 of FIG. 8), determines whether this registered user matches the locally logged-in user in S71 and S72 of FIG. 9, and permits the pull scan to be executed when the users match (S72: YES). However, the controller 11 may simply check the registration of the user in S36 (S61) without determining in S71 and S72 whether the registered user matches the logged-in user. That is, the controller 11 may permit the pull scan to be executed when the user requesting the pull scan is registered (S37: YES), regardless of whether the registered user matches the locally logged-in user. In this case, the controller 11 may accept an instruction to execute a pull scan when the SFL feature is disabled or when the SFL feature is enabled and the MFP 10 is in the public mode and may permit the pull scan to be executed when the username received in association with the execution instruction is registered in the SFL database 19.

Further, in a case where the controller 11 initiates a push scan while in a locally logged-in state and thereafter the controller 11 receives a cancellation instruction while still in the locally logged-in state, the controller 11 may prompt the locally logged-in user to re-input the user's password and may cancel the push scan when the inputted password matches the password entered for the locally logged-in user. In this case, the controller 11 may require the locally logged-in user to re-input the user's password by using the user interface 16.

The controller 11 may also be configured not to execute processes for determining whether an error has occurred on the MFP 10, such as the process of S4 described in FIG. 10 and the processes of S95 and S96 in FIG. 11. In this case, the controller 11 performs the touchscreen display process in S5 of FIG. 3 immediately after reaching a NO determination in S3. In this case, the controller 11 performs the process of S98 of FIG. 11 when a NO determination is made in S94. Further, in this case, the controller 11 performs the process of S117 of FIG. 14 when a NO determination is made in S113.

In the embodiment described above, the controller 11 uses the SFL database 19 to authenticate a username (or a user ID) and password and to restrict functions but the controller 11 may use other information to perform authentication and to restrict functions. For example, Active Directory Authentication or LDAP (Lightweight Directory Access Protocol) Authentication may be used. When using Active Directory Authentication, for example, the controller 11 may authenticate a local login to the MFP 10 based on authentication information stored on an Active Directory (U.S. trademark of Microsoft Corporation) server. The controller 11 may also restrict scan functions and the like using restriction settings for individual users stored on the Active Directory server. When using LDAP Authentication, the controller 11 may authenticate local logins to the MFP 10 based on authentication information stored on a Lightweight Directory Access Protocol (LDAP) server. The controller 11 may also restrict functions using restriction settings stored on the LDAP server. The above methods of authentication and restriction may be used in combination or may be switched. Further, authentication information may be stored in a different storage from the restriction settings. For example, the controller 11 may authenticate local logins to the MFP 10 based on authentication information stored on a server and may record restriction settings in the SFL database 19 stored in the memory 12.

In the embodiment described above, the SFL feature may be enabled or disabled through a web page sent by the controller 11 of the MFP 10 on the PC 40. As an alternative, the user may enable or disable the SFL feature through operations on the user interface 16 of the MFP 10. Hence, the controller 11 may receive modifications to restrictions and the like in response to operations performed through the user interface 16 in the same way that modifications were made through the web page.

While the restriction value recorded in the SFL database 19 for the "Scan" function is applied to both push scans and pull scans in the above embodiment, a checkbox may be provided for each type of the pull scan and push scan so that the controller 11 can accept a separate restriction value for each.

The MFP 10 is an example of the reading device. However, the reading device is not limited to the MFP 10. The reading device may be any device having a scanning function. The reading device may be a device only have a scanning function.

Note that the present disclosure includes the phrases "at least one of A and B", "at least one of A, B and C", and the like as alternative expressions that mean one or more of A and B, one or more of A, B and C, and the like, respectively. More specifically, the phrase "at least one of A and B" means (A), (B) or (A and B), and the phrase "at least one of A, B and C" means (A), (B), (C), (A and B), (A and C), (B and C) or (A, B and C).

What is claimed is:

1. A reading device comprising:

a scanner;

a touchscreen; and a controller, wherein the controller is configured to perform:

receiving an execution instruction issued from an external device, the execution instruction instructing the controller to perform a pull scan, the pull scan including: controlling the scanner to read an original to generate scan data based on the original; and returning the scan data to the external device;

starting the pull scan based on the received execution instruction under a first pull scan start condition, the first pull scan start condition including a requirement that the execution instruction is received;

displaying a first scan-in-progress screen on the touchscreen under a first display condition, the first scan-in-progress screen including no cancel button to cancel the started pull scan, the first display condition including: a requirement that first user authentication information is received in association with the execution instruction; and a requirement that the pull scan is started;

displaying a second scan-in-progress screen on the touchscreen under a second display condition, the second scan-in-progress screen including a cancel button to cancel the started pull scan, the second display condition including: a requirement that the first user authentication information is not received in association with the execution instruction; and a requirement that the pull scan is started; and cancelling the started pull scan under a first cancellation condition, the first cancellation condition including a requirement that the cancel button is operated.

2. The reading device according to claim 1, wherein the controller is configured to further perform:

starting the pull scan based on the received execution instruction under a second pull scan start condition, the second pull scan start condition including: a requirement that the execution instruction is received with the reading device in a locally logged-in state in which a user, as a locally-logged-in user, is locally logged in to the reading device based on second user authentication information; a requirement that the first user authentication information is received in association with the execution instruction; and a requirement that the first user authentication information corresponds to the second user authentication information of the locally-logged-in user, wherein the controller does not start the pull scan under a restriction condition, the restriction condition including: a requirement that the execution instruction is received with the reading device in the locally logged-in state; a requirement that the first user authentication information is received in association with the execution instruction; and a requirement that the first user authentication information does not correspond to the second user authentication information of the locally-logged-in user, wherein the controller is configured to further perform:

displaying the second scan-in-progress screen including the cancel button on the touchscreen under a third display condition despite receiving the first user authentication information in association with the execution instruction, the third display condition including a requirement that the pull scan is started under the second pull scan start condition.

3. The reading device according to claim 2, wherein once the pull scan has been started under the second pull scan start condition, the controller rejects at least one of a first operation and a second operation until the pull scan is completed or cancelled, the first operation being an operation to change the locally-logged-in user through the touchscreen and a second operation being an operation to locally log out of the reading device through the touchscreen.

4. The reading device according to claim 2, wherein the controller is configured to further perform:

starting the pull scan based on the execution instruction under a third pull scan start condition, the third pull scan start condition including: a requirement that the execution instruction is received with the reading device in a locally logged-out state in which no user is locally logged in to the reading device; and a requirement that the first user authentication information is received in association with the execution instruction, wherein once the pull scan has been started under the third pull scan start condition, the controller rejects an operation to locally log in to the reading device through the touchscreen until the pull scan is completed or cancelled.

5. The reading device according to claim 1, wherein the controller is configured to further perform:

determining whether an error has occurred on the reading device; and displaying the second scan-in-progress screen including the cancel button on the touchscreen under a third display condition even when the first user authentication information is received in association with the execution instruction, the third display condition including: a requirement that the determining determines that the error has occurred on the reading device.

6. The reading device according to claim 1, wherein the controller is configured to further perform:

receiving a push scan execution instruction based on an operation through the touchscreen, the push scan execution instruction instructing the controller to perform a push scan, the push scan including: reading the original to generate the scan data; and sending the scan data to a destination designated through the touchscreen;

starting the push scan under a push scan start condition, the push scan start condition including a requirement that the push scan execution instruction is received based on the operation through the touchscreen;

displaying a third scan-in-progress screen on the touchscreen following the starting the push scan, the third scan-in-progress screen including a second cancel button to cancel the started push scan; and cancelling the started push scan under a condition that the second cancel button is operated while the push scan is in progress.

7. The reading device according to claim 1, wherein the controller is configured to further perform:

cancelling the started pull scan under a second cancellation condition even when the first user authentication information is received in association with the execution instruction, the second cancellation condition including a requirement that a cancellation instruction to cancel the started pull scan is received from the external device that is a transmission source of the execution instruction.

8. A reading device comprising:

a scanner;

a hardware key to receive an input operation; and a controller, wherein the controller is configured to perform:

receiving an execution instruction issued from an external device, the execution instruction instructing the controller to perform a pull scan, the pull scan including: controlling the scanner to read an original to generate scan data based on the original; and returning the scan data to the external device;

starting the pull scan based on the received execution instruction under a first pull scan start condition, the first pull scan start condition including a requirement that the execution instruction is received; and cancelling the started pull scan under a first cancellation condition, the first cancellation condition including a requirement that no user authentication information is received in association with the execution instruction; and a requirement that a cancellation operation is received through the hardware key while the pull scan is in progress, wherein despite receiving the cancellation operation through the hardware key while the pull scan is in progress, the controller continues the pull scan under a continuation condition, the continuation condition including a requirement that first user authentication information is received in association with the execution instruction.

9. The reading device according to claim 8, wherein the controller is configured to further perform:

starting the pull scan based on the received execution instruction under a second pull scan start condition, the second pull scan start condition including: a requirement that the execution instruction is received with the reading device in a locally logged-in state in which a user, as a locally-logged-in user, is locally logged in to the reading device based on second user authentication information; a requirement that the first user authentication information is received in association with the execution instruction; and a requirement that the first user authentication information corresponds to the second user authentication information of the locally-logged-in user, wherein the controller does not start the pull scan under a restriction condition, the restriction condition including: a requirement that the execution instruction is received with the reading device in the locally logged-in state; a requirement that the first user authentication information is received in association with the execution instruction; and a requirement that the first user authentication information does not correspond to the second user authentication information of the locally-logged-in user, wherein the controller is configured to further perform:

cancelling the started pull scan under a second cancellation condition despite receiving the first user authentication information in association with the execution instruction, the second cancellation condition including: a requirement that the pull scan is started under the second pull scan start condition; and a requirement that the cancellation operation is received through the hardware key while the pull scan is in progress.

10. The reading device according to claim 9, further comprising:

a touchscreen, wherein once the pull scan has been started under the second pull scan start condition, the controller rejects at least one of a first operation and a second operation until the pull scan is completed or cancelled, the first operation being an operation to change the locally-logged-in user through the touchscreen and a second operation being an operation to locally log out of the reading device through the touchscreen.

11. The reading device according to claim 9, further comprising:

a touchscreen, wherein the controller is configured to further perform:

starting the pull scan based on the execution instruction under a third pull scan start condition, the third pull scan start condition including: a requirement that the execution instruction is received with the reading device in a locally logged-out state in which no user is locally logged in to the reading device; and a requirement that the first user authentication information is received in association with the execution instruction, wherein once the pull scan has been started under the third pull scan start condition, the controller rejects an operation to locally log in to the reading device through the touchscreen until the pull scan is completed or cancelled.

12. The reading device according to claim 8, wherein the controller is configured to further perform:

determining whether an error has occurred on the reading device; and cancelling the started pull scan under a second cancellation condition even when the first user authentication information is received in association with the execution instruction, the second cancellation condition including: a requirement that the determining determines that the error has occurred on the reading device; and a requirement that the cancellation operation is received through the hardware key while the pull scan is in progress.

13. The reading device according to claim 8, further comprising:

a touchscreen, wherein the controller is configured to further perform:

receiving a push scan execution instruction based on an operation through the touchscreen, the push scan execution instruction instructing the controller to perform a push scan, the push scan including: reading the original to generate the scan data; and sending the scan data to a destination designated through the touchscreen;

starting the push scan under a push scan start condition, the push scan start condition including a requirement that the push scan execution instruction is received based on the operation through the touchscreen; and cancelling the started push scan under a condition that a push-scan cancellation operation is received through the hardware key while the push scan is in progress.

14. The reading device according to claim 8, wherein the controller is configured to further perform:

cancelling the started pull scan under a second cancellation condition even when the first user authentication information is received in association with the execution instruction, the second cancellation condition including a requirement that a cancellation instruction to cancel the started pull scan is received from the external device that is a transmission source of the execution instruction.

* * * * *